(12) United States Patent
Sung et al.

(10) Patent No.: US 10,177,944 B2
(45) Date of Patent: Jan. 8, 2019

(54) COMMUNICATION CIRCUIT CHIP AND ELECTRONIC DEVICE CONFIGURED TO DECODE DATA WITH REFERENCE TO RECEPTION CHARACTERISTIC ANALYZED BASED ON START-OF-FRAME PATTERN

(71) Applicant: SAMSUNG ELECTRONICS CO., LTD., Suwon-si, Gyeonggi-do (KR)

(72) Inventors: Hyukjun Sung, Seongnam-si (KR); Hyunjae Kang, Seoul (KR); Dohyung Kim, Seoul (KR); Jaehun Choi, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/425,609

(22) Filed: Feb. 6, 2017

(65) Prior Publication Data

US 2017/0257233 A1 Sep. 7, 2017

(30) Foreign Application Priority Data

Mar. 7, 2016 (KR) .......................... 10-2016-0027105

(51) Int. Cl.
*H04L 25/03* (2006.01)
*H04L 5/00* (2006.01)
(Continued)

(52) U.S. Cl.
CPC ...... *H04L 25/03273* (2013.01); *H04L 5/0048* (2013.01); *H04L 7/042* (2013.01);
(Continued)

(58) Field of Classification Search
USPC ................ 375/219, 211, 220, 222, 221, 240, 375/240.26, 254, 259, 271, 279, 280, 282,
(Continued)

(56) References Cited

U.S. PATENT DOCUMENTS 5,945,875 A  8/1999 Zhou et al.
6,696,900 B2 2/2004 Stillman et al.
(Continued)

OTHER PUBLICATIONS

Hyongmin Lee et al., "Differentiating ASK Demodulator for Contactless Smart Cards Supporting VHBR", IEEE Transactions on Circuits and Systems II: Express Briefs.
(Continued)

*Primary Examiner* — Linda Wong
(74) *Attorney, Agent, or Firm* — Volentine, Whitt & Francos, PLLC

(57) ABSTRACT

An electronic device includes a clock recovery circuit, a converter circuit, and a decoder circuit. The clock recovery circuit generates a reference clock. The converter circuit generates a conversion value that corresponds to a difference between a phase of reception data and a phase of the reference clock. The decoder circuit analyzes a reception characteristic of an antenna based on conversion values that corresponds to a start-of-frame (SOF) marker. The decoder circuit decodes a conversion value that corresponds to encoded data following the SOF marker in the reception data, with reference to the analyzed reception characteristic, into a digital value.

15 Claims, 23 Drawing Sheets

(51) Int. Cl.
  *H04L 29/06* (2006.01)
  *H04L 7/04* (2006.01)
  *H04L 7/033* (2006.01)
(52) U.S. Cl.
  CPC ........ *H04L 25/03853* (2013.01); *H04L 69/22* (2013.01); *H04L 7/033* (2013.01)
(58) Field of Classification Search
  USPC ....... 375/284, 285, 294, 293, 295, 316, 322, 375/324, 326, 327, 329, 346, 354, 355, 375/359, 360, 362, 363, 364, 365, 368, 375/371, 373
  See application file for complete search history.

(56) References Cited

U.S. PATENT DOCUMENTS

| | | | |
|---|---|---|---|
| 7,003,407 B1 | 2/2006 | Kari et al. | |
| 7,197,136 B1* | 3/2007 | Usui | H04L 27/2332 329/304 |
| 7,394,870 B2* | 7/2008 | Chien | H04L 7/042 375/150 |
| 8,331,520 B2 | 12/2012 | Ueda et al. | |
| 8,406,633 B1* | 3/2013 | Johnston | H04J 3/0608 398/154 |
| 8,515,454 B2 | 8/2013 | Shepherd et al. | |
| 8,548,031 B2* | 10/2013 | Djadi | H04B 1/0028 375/219 |
| 8,571,158 B2* | 10/2013 | Chen | H03L 7/087 375/354 |
| 8,831,070 B2 | 9/2014 | Huang et al. | |
| 8,842,720 B2 | 9/2014 | van de Beek et al. | |
| 9,124,393 B2 | 9/2015 | Van De Beek et al. | |
| 2004/0196926 A1* | 10/2004 | Chien | H04L 7/042 375/316 |
| 2005/0190739 A1* | 9/2005 | Sparrell | H04B 7/2659 370/347 |
| 2011/0134565 A1* | 6/2011 | Wilson | B82Y 10/00 360/77.05 |

OTHER PUBLICATIONS

ST Microelectronics, Technical note ; NFC Guide, Jun. 2015; 35 pages.

* cited by examiner

FIG. 3

Example
16 PSK
PR = 60° (PH = +32°, PL = −28°)
PI = 4°

| Symbol | Phase | Value |
|---|---|---|
| D0 | −28° | 0000 |
| D1 | −24° | 0001 |
| D2 | −20° | 0010 |
| D3 | −16° | 0011 |
| D4 | −12° | 0100 |
| D5 | −8° | 0101 |
| D6 | −4° | 0110 |
| D7 | 0° | 0111 |
| D8 | +4° | 1000 |
| D9 | +8° | 1001 |
| D10 | +12° | 1010 |
| D11 | +16° | 1011 |
| D12 | +20° | 1100 |
| D13 | +24° | 1101 |
| D14 | +28° | 1110 |
| D15 | +32° | 1111 |

FIG. 10

SOF

| Symbol Sequence | Phase | Symbol Sequence | Phase | Symbol Sequence | Phase |
|---|---|---|---|---|---|
| 1 | +28° | 41 | +28° | 71 | +20° |
| 2 | +28° | 42 | +28° | 72 | +4° |
| 3 | -28° | 43 | -28° | 73 | +16° |
| 4 | -28° | 44 | -28° | 74 | -8° |
| 5 | +28° | 45 | +28° | 75 | -16° |
| 6 | +28° | 46 | -28° | 76 | -16° |
| 7 | -28° | 47 | +28° | 77 | +16° |
| 8 | -28° | 48 | -28° | 78 | +28° |
| 9 | +28° | 49 | +32° | 79 | -20° |
| 10 | +28° | 50 | +32° | 80 | -28° |
| 11 | -28° | 51 | -28° | 81 | +32° |
| 12 | -28° | 52 | +8° | 82 | +8° |
| 13 | +28° | 53 | -12° | 83 | -28° |
| 14 | +28° | 54 | +32° | 84 | -16° |
| 15 | -28° | 55 | 0° | 85 | +12° |
| 16 | -28° | 56 | +16° | 86 | -16° |
| 17 | +28° | 57 | -8° | 87 | +28° |
| 18 | +28° | 58 | +28° | 88 | +16° |
| ⋮ | ⋮ | ⋮ | ⋮ | ⋮ | ⋮ |
| 36 | -28° | 66 | -20° | 136 | +24° |
| 37 | +28° | 67 | -24° | 137 | +28° |
| 38 | +28° | 68 | +24° | 138 | -24° |
| 39 | -28° | 69 | -12° | 139 | -28° |
| 40 | -28° | 70 | -20° | 140 | +32° |

COMMUNICATION CIRCUIT CHIP AND ELECTRONIC DEVICE CONFIGURED TO DECODE DATA WITH REFERENCE TO RECEPTION CHARACTERISTIC ANALYZED BASED ON START-OF-FRAME PATTERN

CROSS-REFERENCE TO RELATED APPLICATIONS

This U.S. non-provisional patent application claims priority under 35 U.S.C. § 119 to Korean Patent Application No. 10-2016-0027105 filed on Mar. 7, 2016, in Korean Intellectual Property Office, the entire contents of which are incorporated herein by reference.

FIELD OF THE INVENTION

The present disclosure relates to an electronic device/system, and more particularly, relates to a scheme of processing data for communication between electronic devices.

BACKGROUND

Various types of electronic devices are being used these days. An electronic device may provide a service to a user while operating alone. An electronic device may also provide a service to a user while communicating with another electronic device.

Communication between electronic devices is performed in compliance with one or more of various wired/wireless communication protocols. An electronic device may employ a communication process defined in a communication protocol to understand data/information exchanged with another electronic device.

Communication between electronic devices has been variously evolved. In particular, a total amount of data/information exchanged between electronic devices increases continuously, and each size of the data/information also increases. To exchange a large amount of data/information, speed of communication between electronic devices becomes faster. To improve performance of communication and to maximize user satisfaction, a communication process defined in a communication protocol is being evolved such that high-speed communication can be performed.

However, when communication speed becomes faster, a time margin for stable data sampling may become short. In addition, a portable/mobile electronic device is sensitive to an issue of power consumption, thus the portable/mobile electronic device performs communication while consuming a small amount of power. As a result, it may be difficult to exchange data/information rapidly and stably in a narrow channel bandwidth. Accordingly, a communication method for stably performing communication while maximizing communication performance is required.

SUMMARY

Example embodiments of the present disclosure may provide configurations and operations of a communication circuit and an electronic device to stably process high-speed communication.

In some example embodiments, an electronic device may include a clock recovery circuit, a converter circuit, and a decoder circuit. The clock recovery circuit may generate a reference clock based on reception data that is received through an antenna. The converter circuit may generate a conversion value that corresponds to a difference between a phase of the reception data and a phase of the reference clock. The decoder circuit may decode the conversion value into a digital value. The decoder circuit may include a start pattern detector, a characteristic analyzer, and a decoder. The start pattern detector may detect a data pattern of a start-of-frame (SOF) marker that indicates the start of the reception data. The characteristic analyzer may analyze a reception characteristic of the antenna based on conversion values that corresponds to the data pattern of the SOF marker. The decoder may decode a conversion value that corresponds to encoded data following the SOF marker in the reception data, to generate the digital value, with reference to the analyzed reception characteristic.

In some example embodiments, a communication circuit chip may include a start pattern detector, a characteristic analyzer, and a decoder. The start pattern detector may detect a first data pattern included in a start-of-frame (SOF) marker that indicates the start of reception data received through an antenna. The characteristic analyzer may analyze a reception characteristic of the antenna based on phase differences between a phase of a reference clock and phases of a second data pattern following the first data pattern in the SOF marker. The decoder may generate a digital value that corresponds to a phase difference between the phase of the reference clock and a phase of encoded data following the SOF marker in the reception data, with reference to the analyzed reception characteristic.

In some example embodiments, a very-high bitrate (VHBR) communication receiver includes a phase-to-digital converter circuit that converts first, second, and third symbols received, from a communication transmitter, through an antenna into first, second, and third conversion values, respectively. A subtraction circuit subtracts the first conversion value from the second conversion value to generate a first difference value. A processing circuit identifies a characteristic of the communication channel between the communication transmitter and the phase-to-digital converter circuit based on the first difference value. A decoder modifies the decoding of the third conversion value into third data based upon the identified characteristic. The third data represents information communicated by the communication transmitter and received by the phase-to-digital converter as the third symbol.

BRIEF DESCRIPTION OF THE DRAWINGS

FIG. 3 is a conceptual diagram illustrating an example of data symbols implemented based on a modulation method of FIG. 2.

FIG. 10 is a table illustrating an example configuration of a start-of-frame (SOF) marker included in reception data of FIG. 9.

DETAILED DESCRIPTION OF EMBODIMENTS

Below, the example embodiments of the present disclosure will now be described more fully so that those skilled in the art can readily comprehend the disclosure.

Figure 1:
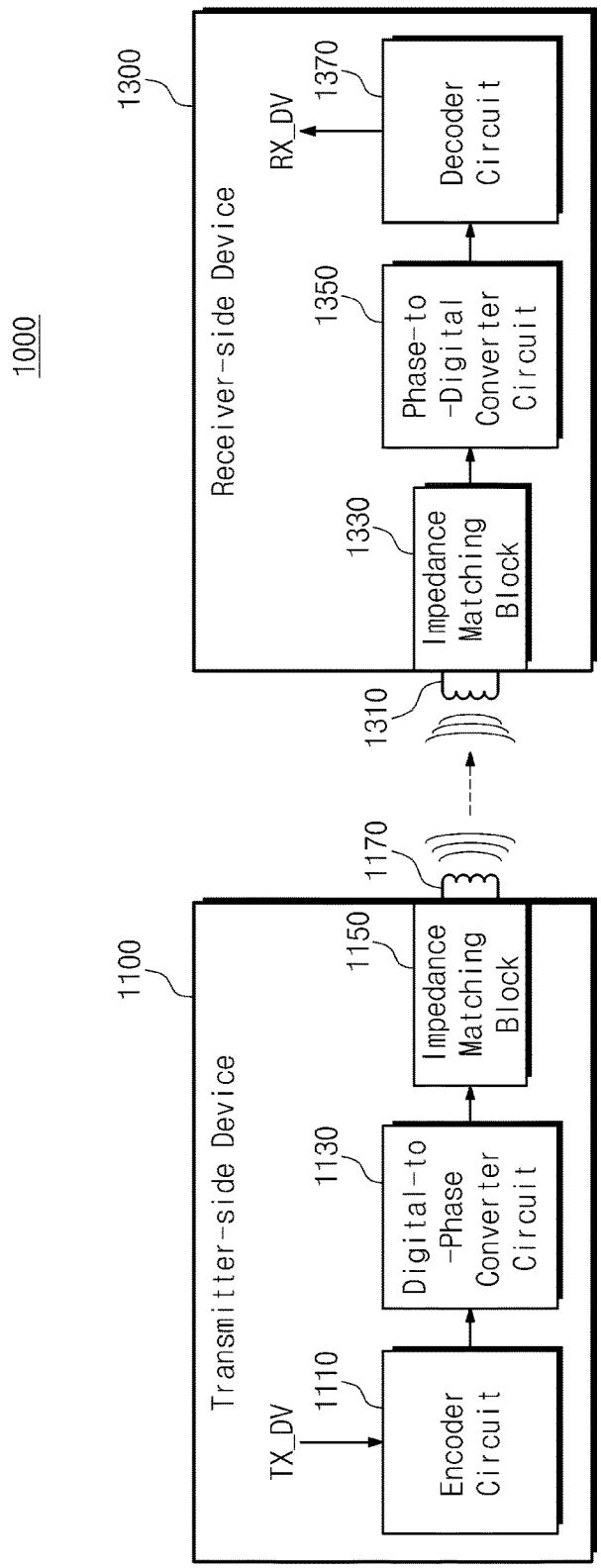
FIG. 1 is a block diagram of a communication system including electronic devices that may communicate with one another according to some example embodiments.

FIG. 1 is a block diagram of a communication system including electronic devices that may communicate with one another according to some example embodiments.

For example, a communication system 1000 may include two devices 1100 and 1300 that may communicate with each other. The communication system 1000 may include a transmitter-side device 1100 that transmits a data signal. The communication system 1000 may also include a receiver-side device 1300 that receives a data signal from the transmitter-side device 1100.

The transmitter-side device 1100 and the receiver-side device 1300 may communicate with each other in compliance with one or more of various wired/wireless communication protocols. For example, the transmitter-side device 1100 and the receiver-side device 1300 may employ at least one of various wired communication protocols such as transfer control protocol/internet protocol (TCP/IP), peripheral component interconnection express (PCIe), universal serial bus (USB), Firewire, and/or the like, and/or at least one of various wireless communication protocols such as global system for mobile communication (GSM), code division multiple access (CDMA), wideband CDMA (WCDMA), high speed packet access (HSPA), evolution-data optimized (EV-DO), long term evolution (LTE), worldwide interoperability for microwave access (WiMax), wireless fidelity (Wi-Fi), Wi-Fi direct, wireless broadband (WiBro), radio frequency identification (RFID), Bluetooth, near field communication (NFC), and/or the like.

Each of the transmitter-side device 1100 and the receiver-side device 1300 may be implemented in an electronic device. For example, each of the transmitter-side device 1100 and the receiver-side device 1300 may be implemented in one of various electronic devices such as a computer, a smart phone, an NFC or RFID tag, an integrated circuit (IC) chip or card, a card reader device for an NFC card or an IC card.

In the following descriptions, it will be assumed that the transmitter-side device 1100 and the receiver-side device 1300 communicate wirelessly with each other in compliance with an NFC communication protocol. However, this assumption is provided to help better understanding, and not to limit the present disclosure. Various example embodiments that will be described below may be applied to other communication protocols than the NFC communication protocol.

In some example embodiments, the transmitter-side device 1100 may include an encoder circuit 1110, a digital-to-phase converter circuit 1130, an impedance matching block 1150, and an antenna 1170. In some example embodiments, the receiver-side device 1300 may include an antenna 1310, an impedance matching block 1330, a phase-to-digital converter circuit 1350, and a decoder circuit 1370. Each of the components in the transmitter-side device 1100 and the receiver-side device 1300 may include one or more analog circuits and/or digital circuits to perform their functions that will be described below.

The encoder circuit 1110 may receive a transmission digital value TX_DV. The transmission digital value TX_DV may include information to be transmitted to the receiver-side device 1300. The transmission digital value TX_DV may be generated inside the transmitter-side device 1100 (e.g., generated by an operation processor circuit of the transmitter-side device 1100), or may be provided from another device or devices. The encoder circuit 1110 may suitably encode the transmission digital value TX_DV to transmit information included in the transmission digital value TX_DV to the receiver-side device 1300.

The digital-to-phase converter circuit 1130 may modulate the encoded transmission digital value TX_DV. For example, the digital-to-phase converter circuit 1130 may perform a phase modulation (PM) for very-high-bitrate (VHBR) communication. The digital-to-phase converter circuit 1130 may modulate the encoded transmission digital value TX_DV to generate an analog signal. The phase modulation performed by the digital-to-phase converter circuit 1130 will be described with reference to FIGS. 2 and 3.

The analog signal generated by the digital-to-phase converter circuit 1130 may be transmitted to the receiver-side device 1300 through the antenna 1170. By the impedance matching block 1150, an internal impedance of the transmitter-side device 1100 may match an impedance of the antenna 1170. The impedance matching block 1150 may be provided to minimize distortion and loss of a signal to be transmitted.

The receiver-side device 1300 may receive an analog signal from the transmitter-side device 1100 through the antenna 1310. By the impedance matching block 1330, an internal impedance of the receiver-side device 1300 may match an impedance of the antenna 1310. The impedance matching block 1330 may be provided to minimize distortion and loss of a signal being received.

The analog signal received through the antenna 1310 may include reception data. The phase-to-digital converter circuit 1350 may demodulate the reception data. The phase-to-digital converter circuit 1350 may perform a phase demodulation corresponding to the phase modulation performed by the digital-to-phase converter circuit 1130. The phase-to-digital converter circuit 1350 may demodulate the reception data to generate a conversion value according to some example embodiments. The phase demodulation performed by the phase-to-digital converter circuit 1350 will be described with reference to FIG. 4.

The decoder circuit 1370 may receive the conversion value from the digital-to-phase converter circuit 1350. The decoder circuit 1370 may decode the conversion value according to a decoding method corresponding to an encoding method employed by the encoder circuit 1110. The decoder circuit 1370 may decode the conversion value to generate a reception digital value RX_DV. Information included in the reception digital value RX_DV may correspond to the information included in the transmission digital value TX_DV. Thus, the receiver-side device 1300 may receive data transmitted from the transmitter-side device 1100.

FIG. 1 describes that the transmitter-side device 1100 transmits a data signal to the receiver-side device 1300. However, in some cases, the receiver-side device 1300 may transmit a data signal or a response signal to the transmitter-side device 1100. To this end, the transmitter-side device 1100 may further include components corresponding to those of the receiver-side device 1300, and the receiver-side device 1300 may further include components corresponding to those of the transmitter-side device 1100. Some electronic devices may perform functions of both the transmitter-side device 1100 and the receiver-side device 1300.

Figure 2:
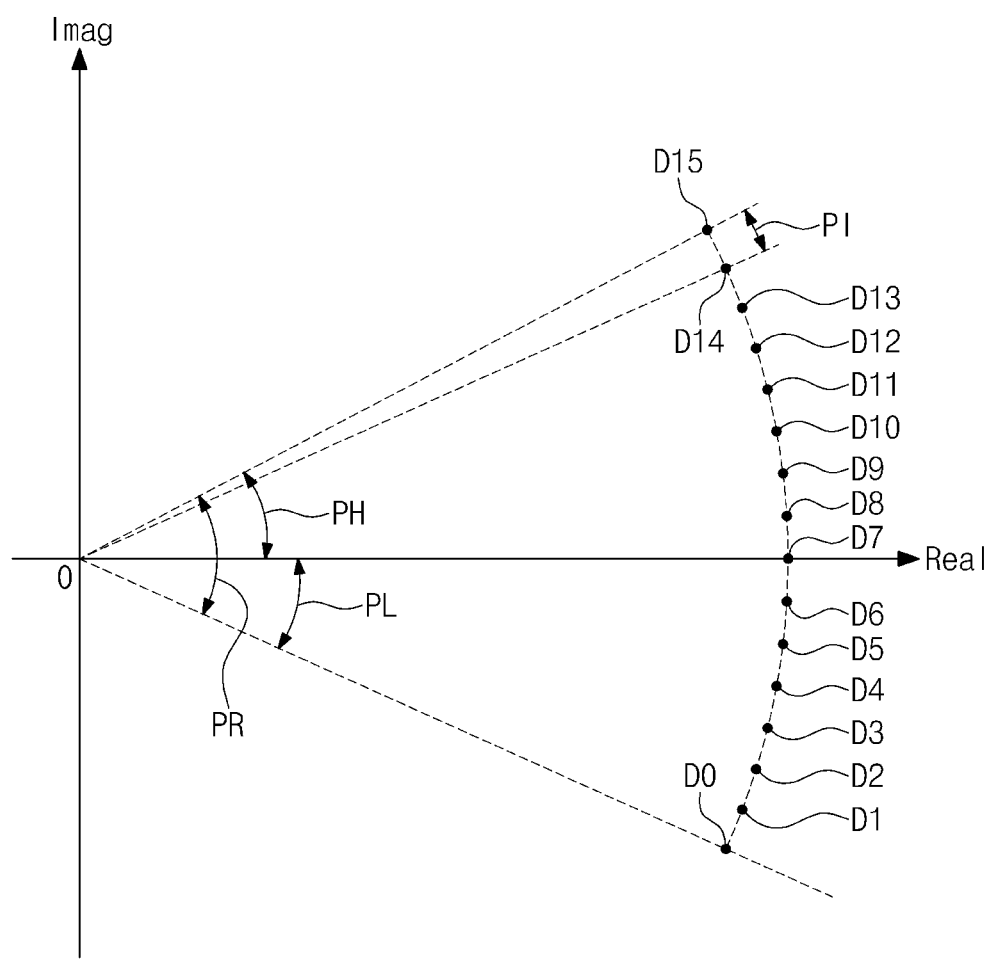
FIG. 2 is a conceptual diagram for describing an example method of modulating data exchanged in a communication system of FIG. 1.

FIG. 2 is a conceptual diagram for describing an example method of modulating data exchanged in a communication system of FIG. 1. In the graph of FIG. 2, the horizontal axis may denote a real number value, and the vertical axis may denote an imaginary number value. Further, the plane in the graph of FIG. 2 may correspond to an I-Q plane. FIG. 3 is a conceptual diagram illustrating an example of data symbols implemented based on a modulation method of FIG. 2. To help better understanding, FIG. 1 will be referenced together with FIGS. 2 and 3.

For example, the digital-to-phase converter circuit 1130 may perform a phase modulation to transmit data to the receiver-side device 1300. The phase modulation may be performed to convert a data value such that data values which are distinguished from one another correspond to data symbols having different phases respectively. For example, a first data value may be converted to correspond to a data symbol having a first phase. A second data value different from the first data value may be converted to correspond to a data symbol having a second phase different from the first phase. The data symbol may mean a data state which is generated to transmit data having a specific data value to the receiver-side device 1300. The data symbol may have a phase corresponding to the specific data state.

For example, the transmitter-side device 1100 may transmit data having a 4-bit data value to the receiver-side device 1300. If a data value is based on a 4-bit bit string, the data may have one of 16 ($=2^4$) data values. Thus, the transmitter-side device 1100 may transmit data to the receiver-side device 1300 based on 16 data symbols. These 16 data symbols may be distinguished from one another based on 16 different phases.

For example, as illustrated in FIG. 2, the transmitter-side device 1100 may transmit data to the receiver-side device 1300 by means of 16 data symbols D0 to D15. The data symbols D0 to D15 may have different phases.

For example, the data symbols D0 may have a phase PL shifted most in a negative direction, and the data symbols D15 may have a phase PH shifted most in a positive direction. A phase range PR may be provided between the phase PL of the data symbol D0 and the phase PH of the data symbol D15.

A phase interval PI may be provided between the phases of the data symbols D0 to D15. The data symbols D0 to D15 may be distinguished from one another based on the phase interval PI. For example, the phase interval PI may be selected considering the phase range (e.g., PR) and the number of the data symbols (e.g., D0 to D15).

According to some phase modulations, a value of the phase range PR may be 360°. According to such phase modulations, the transmitter-side device 1100 may adjust a phase value within the phase range PR of 360° to transmit data to the receiver-side device 1300. However, when the phase change is large, delay caused by the phase adjustment may become long. Thus, communication between the transmitter-side device 1100 and the receiver-side device 1300 may not be performed at high speed. In addition, when the phase change is large, the amount of power consumed in each of the transmitter-side device 1100 and the receiver-side device 1300 may increase.

In some example embodiments, the transmitter-side device 1100 and the receiver-side device 1300 may perform a phase modulation and demodulation for VHBR communication. To this end, the phase range PR may have a value smaller than 360°.

For example, as illustrated in FIG. 3, a value of the phase range PR may be selected as 60°. For example, a value of the phase PL shifted most in a negative direction may be −28°, and a value of the phase PH shifted most in a positive direction may be +32°. For example, when 16 phase shift keying (PSK) is employed (e.g., when 16 data symbols D0 to D15 are provided), a value of the phase interval PI may be 4° (=60°/(16−1)). In some cases, the phase interval PI between the data symbols D0 to D15 may not be uniform, but it will be assumed that the phase interval PI between the data symbols D0 to D15 is uniform to help better understanding.

For example, the data symbol D0 may have a phase of −28°, and may correspond to a data value of 0000. For example, the data symbol D1 adjacent to the data symbol D0 may have a phase of −24°, and may correspond to a data value of 0001. A difference between phases of adjacent data symbols may correspond to the phase interval PI. For example, a difference between phases of the data symbols D0 and D1 may be 4°. In this manner, the data symbols D0 to D15 may have different phases, and may correspond to different data values.

The transmitter-side device 1100 may output a signal having a phase of −28° (e.g., a signal corresponding to the data symbol D0) to transmit data of 0000 to the receiver-side device 1300. Similarly, the transmitter-side device 1100 may output a signal having a phase of −24° (e.g., a signal corresponding to the data symbol D1) to transmit data of 0001 to the receiver-side device 1300. In this manner, the transmitter-side device 1100 may output signals having 16 different phases to transmit data to the receiver-side device 1300.

When the phase range PR is smaller than 360° (e.g., when the phase range PR is 60°), delay caused by the phase adjustment may become short. Thus, communication between the transmitter-side device 1100 and the receiver-side device 1300 may be performed at high speed, and communication performance may be enhanced. In addition, the amount of power consumed in adjusting a phase may be reduced.

An example of a phase modulation has been described with reference to FIGS. 2 and 3. The values described with reference to FIGS. 2 and 3 (e.g., the number of data symbols, a value of the phase range PR, a value of the phase interval PI, values of the phases PH and PL, etc.) and a correspondence relationship between the data symbol, the phase, and the data illustrated in FIG. 3 are not intended to limit the present disclosure. Parameters and a correspondence relationship for a phase modulation may be variously changed or modified. However, to help better understanding, examples and example embodiments will be described below based on the method described with reference to FIGS. 2 and 3.

Figure 4:
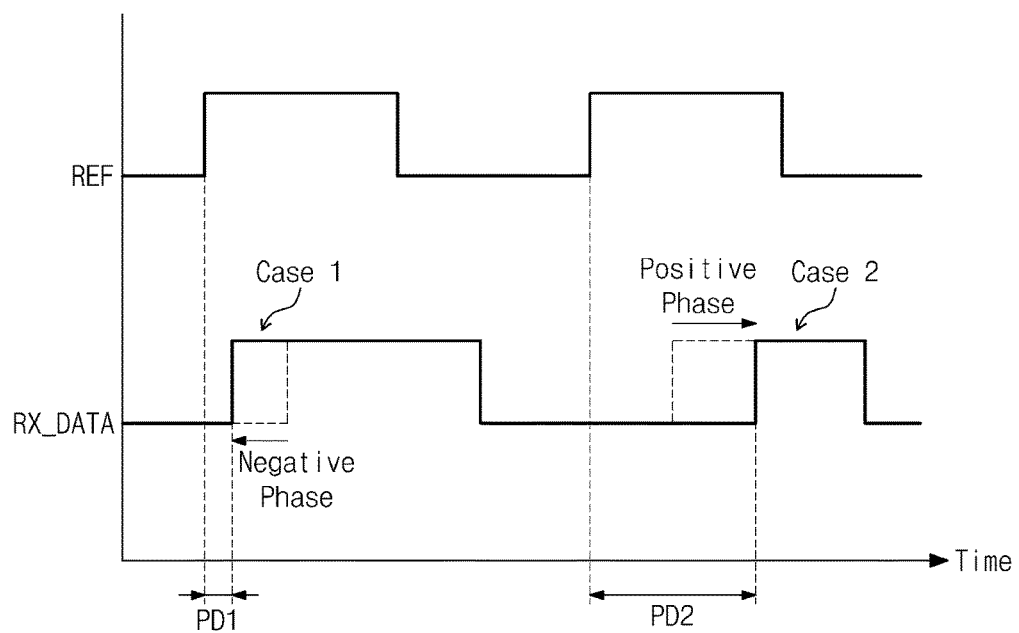
FIG. 4 is a timing diagram for describing an example method of demodulating reception data in a receiver-side device of FIG. 1.

FIG. 4 is a timing diagram for describing an example method of demodulating reception data in a receiver-side device of FIG. 1. To help better understanding, FIGS. 1 to 3 will be referenced together with FIG. 4.

As described with reference to FIGS. 2 and 3, the transmitter-side device 1100 may output signals having different phases. The receiver-side device 1300 may understand a data value transmitted from the transmitter-side device 1100, based on a phase of a signal being received.

As described with reference to FIG. 1, the receiver-side device 1300 may receive reception data RX_DATA from the transmitter-side device 1100 through the antenna 1310. The reception data RX_DATA may have a phase that varies depending on a data value of the reception data RX_DATA.

The receiver-side device 1300 may generate a reference clock REF. The reference clock REF may have a reference phase referenced to determine the phase of the reception data RX_DATA. To accurately determine the phase of the reception data RX_DATA, the reference clock REF may have a (substantially) constant period, a (substantially) constant frequency, and a (substantially) constant phase. Herein, the term "substantially" means that the period, the frequency, and the phase may slightly fluctuate within allowable levels.

The receiver-side device 1300 may determine the phase of the reception data RX_DATA, based on a phase difference between the phase of the reference clock REF and the phase of the reception data RX_DATA. The phase of the reference clock REF may be maintained constantly, thus the phase difference between the phase of the reference clock REF and the phase of the reception data RX_DATA may be observed to determine the phase of the reception data RX_DATA.

For example, referring to the first case of FIG. 4, the phase of the reception data RX_DATA may be shifted in a negative direction. In the first case, a first phase difference PD1 may be provided between the reference clock REF and the reception data RX_DATA. On the other hand, referring to the second case of FIG. 4, the phase of the reception data RX_DATA may be shifted in a positive direction. In the second case, a second phase difference PD2 may be provided between the reference clock REF and the reception data RX_DATA.

Comparing the first case and the second case, it may be appreciated that the first phase difference PD1 is smaller than the second phase difference PD2. For example, as the reception data RX_DATA is shifted more in a negative direction, the phase difference between the phase of the reference clock REF and the phase of the reception data RX_DATA may become smaller. For example, as the reception data RX_DATA is shifted more in a positive direction, the phase difference between the phase of the reference clock REF and the phase of the reception data RX_DATA may become larger. Thus, the receiver-side device 1300 may determine the phase of the reception data RX_DATA based on the phase difference between the phase of the reference clock REF and the phase of the reception data RX_DATA. Further, the receiver-side device 1300 may understand the data value of the reception data RX_DATA based on the determined phase of the reception data RX_DATA.

Meanwhile, as described with reference to FIGS. 2 and 3, the phase range PR may become narrower to perform VHBR communication. Thus, the phase interval PI may also become narrower, and thus this may make it difficult to accurately determine the phase difference between the phase of the reference clock REF and the phase of the reception data RX_DATA. In addition, if communication speed becomes faster, a time margin for stably sampling the reception data RX_DATA may become shorter. Due to these reasons, in some cases, communication between the transmitter-side device 1100 and the receiver-side device 1300 may not be stably performed.

Accordingly, in some example embodiments, the receiver-side device 1300 may analyze a reception characteristic based on the reception data RX_DATA to perform communication rapidly and stably. Further, the receiver-side device 1300 may decode the reception data RX_DATA based on the analyzed reception characteristic. Example configurations and operations of the receiver-side device 1300 will be described with reference to FIGS. 5 through 24.

Figure 5:
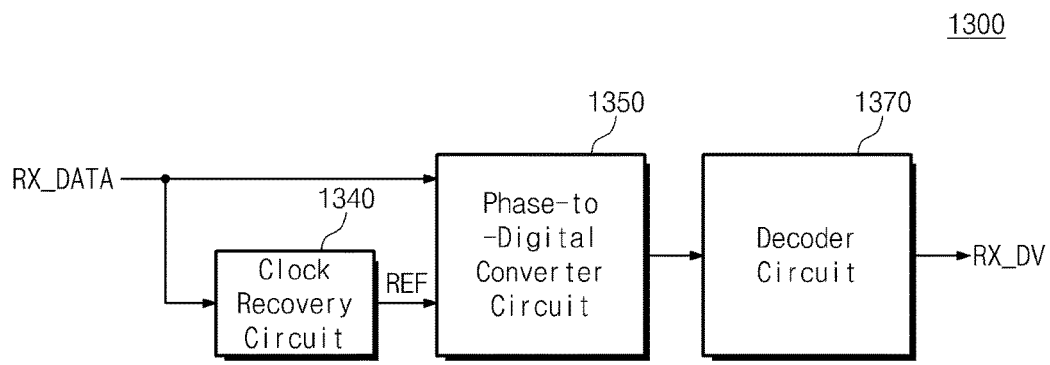
FIG. 5 is a block diagram illustrating an example configuration of a receiver-side device of FIG. 1.

FIG. 5 is a block diagram illustrating an example configuration of a receiver-side device of FIG. 1.

In some example embodiments, the receiver-side device 1300 may include a clock recovery circuit 1340, a phase-to-digital converter circuit 1350, and a decoder circuit 1370. The receiver-side device 1300 may receive the reception data RX_DATA through the antenna 1310 of FIG. 1. Some example configurations of the receiver-side device 1300 will be described with reference to FIGS. 9 and 10.

The clock recovery circuit 1340 may generate the reference clock REF based on the reception data RX_DATA. The clock recovery circuit 1340 may extract a clock frequency for the reception data RX_DATA, based on a pattern of the reception data RX_DATA. The clock recovery circuit 1340 may generate the reference clock REF having the extracted clock frequency. Some example configurations of the clock recovery circuit 1340 will be described with reference to FIG. 6.

FIG. 5 describes that the reference clock REF is generated by the clock recovery circuit 1340. However, the present disclosure is not limited by FIG. 5. The reference clock REF may be provided from a clock generator (not illustrated) included in the receiver-side device 1300, or may be provided from the transmitter-side device 1100 of FIG. 1 or another device of devices.

The phase-to-digital converter circuit 1350 may receive the reception data RX_DATA and the reference clock REF. The phase-to-digital converter circuit 1350 may calculate a phase difference between a phase of the reception data RX_DATA and a phase of the reference clock REF. The phase difference between the phase of the reception data RX_DATA and the phase of the reference clock REF has been described with reference to FIG. 4. The phase-to-digital converter circuit 1350 may generate a conversion value that corresponds to the calculated phase difference. Some example configurations of the phase-to-digital converter circuit 1350 will be described with reference to FIGS. 7 and 8.

The decoder circuit 1370 may receive the conversion value. The decoder circuit 1370 may decode the conversion value. The decoder circuit 1370 may generate the reception digital value RX_DV as a decoding result. The reception digital value RX_DV may be referenced (e.g., by an operation processor circuit of the receiver-side device 1300) to provide a service to a user of the receiver-side device 1300. Alternatively, or additionally, the reception digital value RX_DV may be provided to another device or other devices.

In some example embodiments, the decoder circuit 1370 may analyze a reception characteristic (e.g., a reception characteristic of the antenna 1310) of the receiver-side device 1300. The decoder circuit 1370 may perform a decoding operation based on the analyzed reception characteristic. Thus, the receiver-side device 1300 may accurately decode the reception data RX_DATA based on the reception characteristic. Consequently, rapid and stable communication may be performed. Some example configurations and operations of the decoder circuit 1370 will be described with reference to FIGS. 11 to 24.

Figure 6:
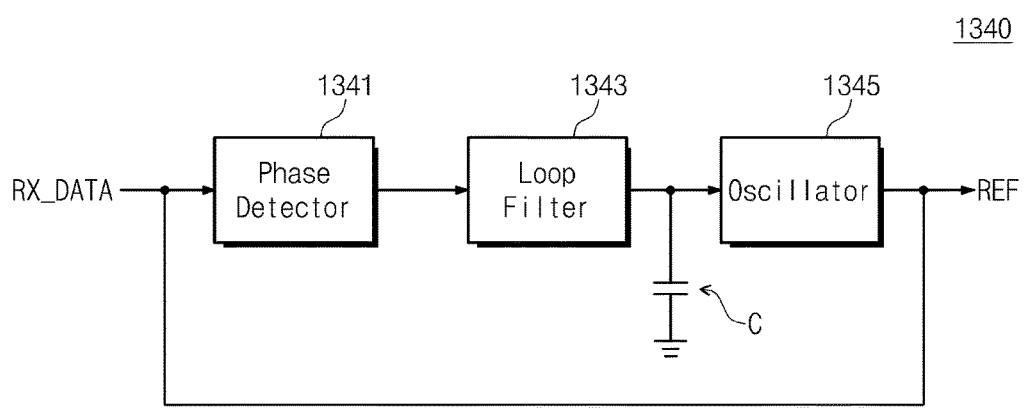
FIG. 6 is a block diagram illustrating an example configuration of a clock recovery circuit of FIG. 5.

FIG. 6 is a block diagram illustrating an example configuration of a clock recovery circuit of FIG. 5. In some example embodiments, the clock recovery circuit 1340 may include a phase detector 1341, a loop filter 1343, an oscillator 1345, and a capacitor C.

The phase detector 1341 may receive the reception data RX_DATA. The phase detector 1341 may detect a phase of the reception data RX_DATA. For example, the phase detector 1341 may determine the phase of the reception data RX_DATA with reference to a reference signal. The reference signal may be generated inside the phase detector 1341, or may be provided from the outside of the phase detector 1341.

The loop filter 1343 may filter a specific frequency component or specific frequency components of a signal which flows along a loop of the clock recovery circuit 1340. For example, the loop filter 1343 may cut off a noise component flowing along the loop of the clock recovery circuit 1340. Accordingly, the loop filter 1343 may extract a frequency component having a reference clock frequency for the reference clock REF.

The oscillator 1345 may output the reference clock REF based on the frequency component extracted by the loop filter 1343. Thus, the reference clock REF may be generated to have the reference clock frequency. The reference clock REF output from the oscillator 1345 may be fed back to the phase detector 1341. This negative feedback loop may cause the reference clock frequency of the reference clock REF to be maintained constant.

Further, in some example embodiments, the capacitor C may be connected to an output of the loop filter 1343. The capacitor C may be charged in response to an output of the loop filter 1343. A voltage between both ends of the charged capacitor C may be maintained at a constant value, based on the output of the loop filter 1343. Thus, the capacitor C may maintain the reference clock frequency of the reference clock REF more constant.

Figure 7:
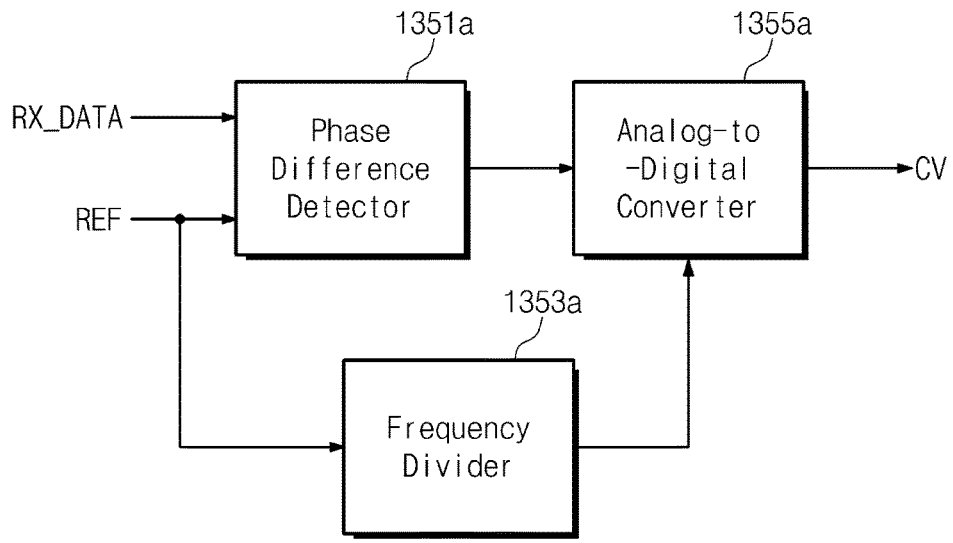
FIG. 7 is a block diagram illustrating an example configuration of a phase-to-digital converter circuit of FIG. 5.

FIG. 7 is a block diagram illustrating an example configuration of a phase-to-digital converter circuit of FIG. 5. In some example embodiments, a phase-to-digital converter circuit 1350*a* may include a phase difference detector 1351*a*, a frequency divider 1353*a*, and an analog-to-digital converter 1355*a*. In some example embodiments, the phase-to-digital converter circuit 1350 of FIG. 5 may include the phase-to-digital converter circuit 1350*a* of FIG. 7.

The phase difference detector 1351*a* may receive the reception data RX_DATA and the reference clock REF. The phase difference detector 1351*a* may, as described with reference to FIG. 4, detect a phase difference between a phase of the reception data RX_DATA and a phase of the reference clock REF.

The phase difference detector 1351*a* may output a voltage having an amplitude that corresponds to the phase difference between the phase of the reception data RX_DATA and the phase of the reference clock REF. To this end, for example, the phase difference detector 1351*a* may include a charge pump (not shown). For example, when the phase difference between the phase of the reception data RX_DATA and the phase of the reference clock REF becomes greater, the phase difference detector 1351*a* may output a voltage having a greater amplitude.

The frequency divider 1353*a* may divide the reference clock frequency of the reference clock REF. The frequency divider 1353*a* may provide a clock having a divided frequency to the analog-to-digital converter 1355*a*.

The analog-to-digital converter 1355*a* may operate in synchronization with a clock received from the frequency divider 1353*a*. The analog-to-digital converter 1355*a* may generate a conversion value CV, based on the amplitude of the voltage output from the phase difference detector 1351*a*. The conversion value CV may vary depending on the amplitude of the voltage output from the phase difference detector 1351*a*. Accordingly, the conversion value CV may vary depending on the phase difference between the phase of the reception data RX_DATA and the phase of the reference clock REF.

Figure 8:
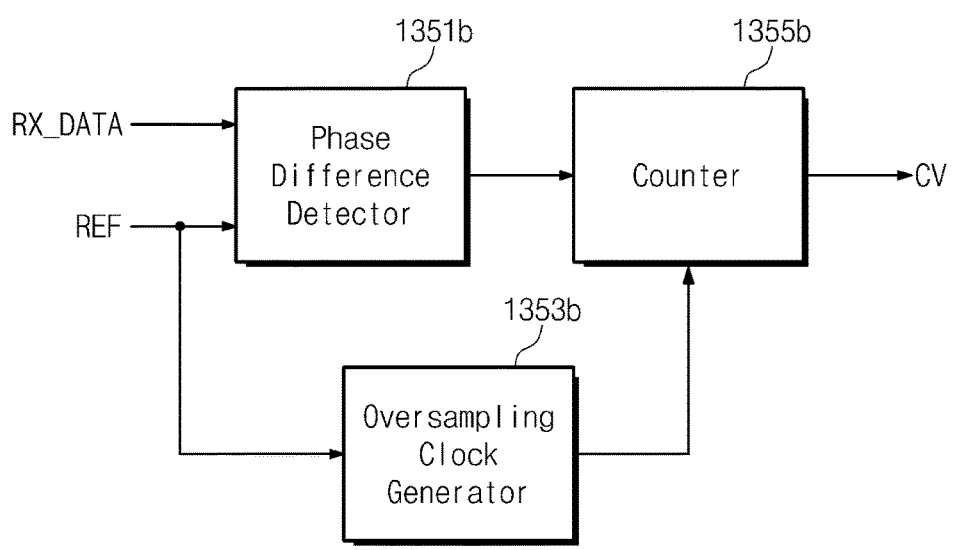
FIG. 8 is a block diagram illustrating an example configuration of a phase-to-digital converter circuit of FIG. 5.

FIG. 8 is a block diagram illustrating an example configuration of a phase-to-digital converter circuit of FIG. 5. In some example embodiments, a phase-to-digital converter circuit 1350*b* may include a phase difference detector 1351*b*, an oversampling clock generator 1353*b*, and a counter 1355*b*. In some example embodiments, the phase-to-digital converter circuit 1350 of FIG. 5 may include the phase-to-digital converter circuit 1350*b* of FIG. 8.

The phase difference detector 1351*b* may receive the reception data RX_DATA and the reference clock REF. The phase difference detector 1351*b* may, as described with reference to FIG. 4, detect a phase difference between a phase of the reception data RX_DATA and a phase of the reference clock REF.

For example, the phase difference detector 1351*b* may include a delimiter. In this example, the phase difference detector 1351*b* may output a first logic value during a first time interval where the phase difference between the phase of the reception data RX_DATA and the phase of the reference clock REF occurs (e.g., during each of time intervals where the phase differences PD1 and PD2 of FIG. 4 occur). The phase difference detector 1351*b* may also output a second logic value during a second time interval other than the first time interval.

The oversampling clock generator 1353*b* may generate an oversampling clock by dividing the reference clock frequency of the reference clock REF. The oversampling clock may have a frequency which is higher than the reference clock frequency (e.g., a frequency which is eight times the reference clock frequency). The oversampling clock generator 1353*b* may provide the oversampling clock to the counter 1355*b*.

The counter 1355*b* may operate in synchronization with the oversampling clock received from the oversampling clock generator 1353*b*. For example, the counter 1355*b* may perform a counting operation while the phase difference detector 1351*b* outputs the first logic value (e.g., during a time interval where the phase difference between the phase of the reception data RX_DATA and the phase of the reference clock REF occurs). The counter 1355*b* may generate a conversion value CV as a counting result.

Since the oversampling clock has the frequency higher than the reference clock frequency, the conversion value CV may gradually (e.g., incrementally or stepwise) increase while the phase difference detector 1351b outputs the first logic value. Accordingly, the conversion value CV may vary depending on a length of the time interval where the phase difference between the phase of the reception data RX_DATA and the phase of the reference clock REF occurs. Consequently, the conversion value CV may vary depending on the phase difference between the phase of the reception data RX_DATA and the phase of the reference clock REF.

Figure 9:
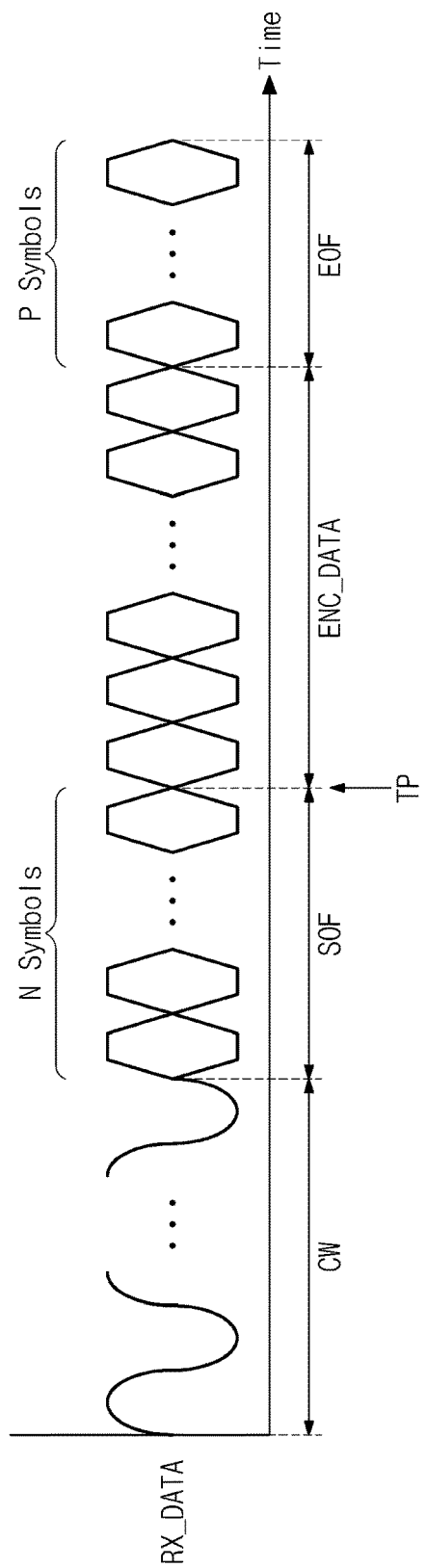
FIG. 9 is a timing diagram illustrating an example configuration of reception data received in a receiver-side device of FIG. 1.

FIG. 9 is a timing diagram illustrating an example configuration of reception data received in a receiver-side device of FIG. 1. For example, the reception data RX_DATA may include a continuous wave CW, a start-of-frame (SOF) marker, an encoded data ENC_DATA, and an end-of-frame (EOF) marker. For example, the continuous wave CW, the SOF marker, the encoded data ENC_DATA, and the EOF marker may be sequentially and successively received in a time domain.

The continuous wave CW may include a carrier wave that is transmitted from the transmitter-side device 1100 of FIG. 1. The receiver-side device 1300 of FIG. 1 may prepare to receive the reception data RX_DATA in response to the continuous wave CW.

The SOF marker may indicate start of the reception data RX_DATA. The receiver-side device 1300 may recognize, in response to the SOF marker SOF, that the encoded data ENC_DATA will be received soon. The SOF marker SOF may include a specific data pattern predetermined in a communication protocol employed between the transmitter-side device 1100 and the receiver-side device 1300. For example, a data pattern of the SOF marker SOF may include N data symbols predetermined in the communication protocol. Thus, the receiver-side device 1300 may recognize that the SOF marker SOF is received in response to receiving the data pattern corresponding to the SOF marker SOF.

The encoded data ENC_DATA may correspond to main data provided from the transmitter-side device 1100 to the receiver-side device 1300. That is, the encoded data ENC_DATA may include data that is requested to be transmitted from the transmitter-side device 1100 to the receiver-side device 1300. The receiver-side device 1300 may decode the encoded data ENC_DATA. The receiver-side device 1300 may provide a service to a user based on the decoded data, or may provide the decoded data to another device or other devices.

A fore portion of the reception data RX_DATA may include noise. Thus, the reception data RX_DATA may include the SOF marker SOF prior to the encoded data ENC_DATA. The encoded data ENC_DATA may begin to be received at a time point TP after all the predetermined N data symbols of the SOF marker SOF are received. Thus, the SOF marker SOF may be referenced to determine synchronization of the time point TP where the encoded data ENC_DATA begins to be received.

Further, in some example embodiments, the SOF marker SOF may be referenced to analyze the reception characteristic of the receiver-side device 1300 (e.g., the reception characteristic of the antenna 1310 of FIG. 1). Such example embodiments will be described later.

The EOF marker EOF may indicate end of the reception data RX_DATA. The receiver-side device 1300 may recognize that, in response to the EOF marker EOF, receiving the encoded data ENC_DATA is completed. The EOF marker EOF may include a specific data pattern predetermined in the communication protocol employed between the trans- mitter-side device 1100 and the receiver-side device 1300. For example, the data pattern of the EOF marker EOF may include P data symbols predetermined in the communication protocol. Thus, the receiver-side device 1300 may recognize that the EOF marker EOF is received in response to receiving the data pattern corresponding to the EOF marker EOF.

FIG. 10 is a table illustrating an example configuration of an SOF marker included in reception data of FIG. 9.

As described with reference to FIG. 9, the SOF marker SOF may include the N data symbols predetermined in the communication protocol. For example, the SOF marker SOF may include 140 data symbols (i.e., N=140).

For example, each of first and second data symbols of the SOF marker SOF may have a phase of +28°, and each of third and fourth data symbols of the SOF marker SOF may have a phase of −28°. For example, a $52^{th}$ data symbol of the SOF marker SOF may have a phase of +8°, and a $140^{th}$ data symbol of the SOF marker SOF may have a phase of +32°. For brevity, detailed descriptions for other data symbols will be omitted below.

For example, the SOF marker SOF of FIG. 9 may be designed to include the 140 data symbols illustrated in FIG. 10. When the receiver-side device 1300 receives the 140 data symbols illustrated in FIG. 10 according to a symbol sequence illustrated in FIG. 10, the receiver-side device 1300 may recognize that the SOF marker SOF is received. To this end, the receiver-side device 1300 may prepare information associated with data symbols included in the SOF marker SOF in advance (e.g., in advance before the receiver-side device 1300 begins to operate). The prepared information may be stored in a medium such as a memory, storage, and/or the like, of the receiver-side device 1300.

FIG. 10 is intended to show an example configuration of the SOF marker SOF, but not to limit the present disclosure. The SOF marker SOF may have a different configuration depending on a communication protocol employed by the transmitter-side device 1100 and the receiver-side device 1300 of FIG. 1, and the number of data symbols included in the SOF marker SOF may be changed or modified depending on the communication protocol. However, to facilitate better understanding, the following example embodiments will be described based on the example configuration of the SOF marker SOF illustrated in FIG. 10.

An example configuration of the SOF marker SOF has been described with reference to FIG. 10. Meanwhile, the EOF marker EOF of FIG. 9 may also include some data symbols predetermined depending on the communication protocol employed by the transmitter-side device 1100 and the receiver-side device 1300. When the receiver-side device 1300 receives the predetermined data symbols according to a predetermined sequence, the receiver-side device 1300 may recognize that the EOF marker EOF is received. For brevity, detailed descriptions for the EOF marker EOF will be omitted below.

Figure 11:
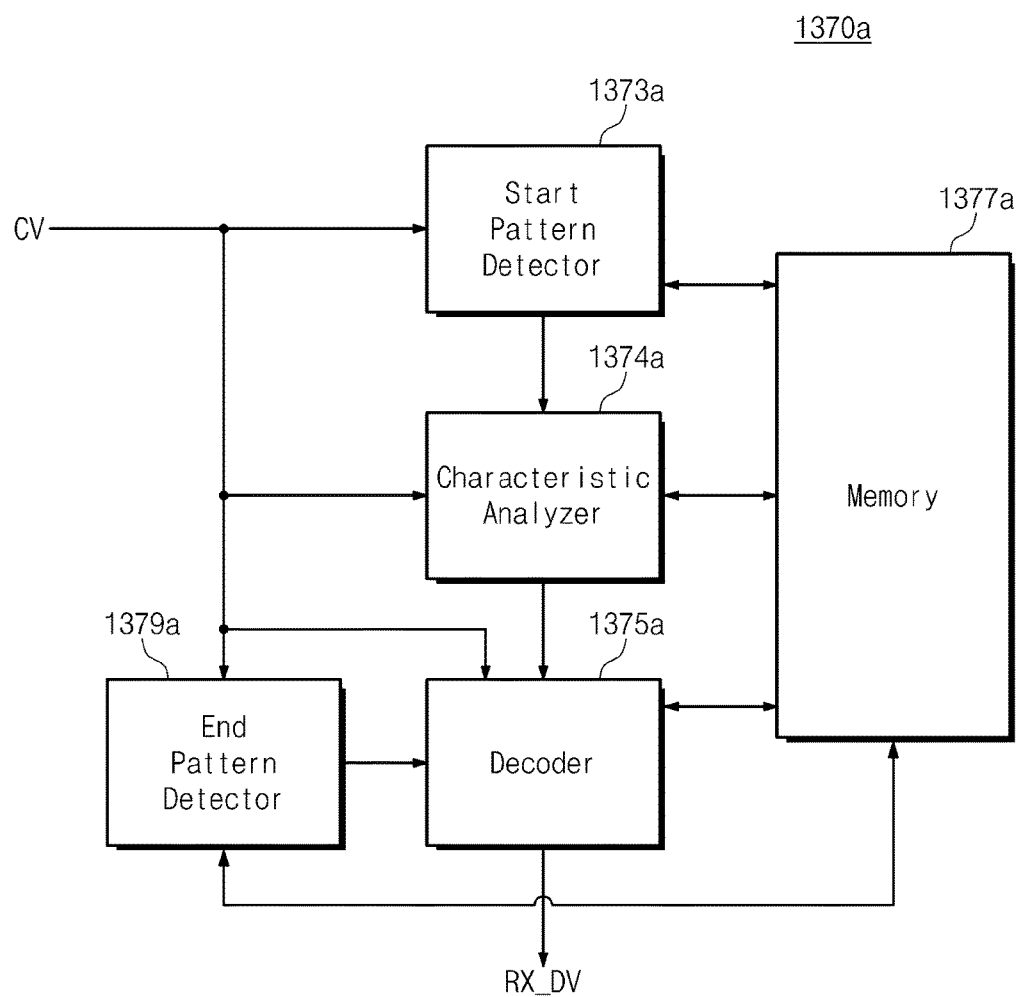
FIG. 11 is a block diagram illustrating an example configuration of a decoder circuit of FIG. 5.

FIG. 11 is a block diagram illustrating an example configuration of a decoder circuit of FIG. 5. In some example embodiments, a decoder circuit 1370a may include a start pattern detector 1373a, a characteristic analyzer 1374a, and a decoder 1375a. In some example embodiments, the decoder circuit 1370 of FIG. 5 may include the decoder circuit 1370a of FIG. 11.

The start pattern detector 1373a may receive a conversion value CV. The start pattern detector 1373a may detect a data pattern of the SOF marker SOF based on the conversion value CV.

As described above, the conversion value CV may vary depending on a phase difference between a phase of the reception data RX_DATA and a phase of the reference clock REF. Further, the SOF marker SOF may include predetermined data symbols. Thus, the start pattern detector 1373a may detect whether the SOF marker SOF is received, with reference to the varying conversion value CV.

In some example embodiments, the start pattern detector 1373a may detect a first data pattern included in the SOF marker SOF. The first data pattern of the SOF marker SOF may include some data symbols of a fore portion of the SOF marker SOF.

The SOF marker SOF may include the predetermined number (e.g., 140) of data symbols to determine synchronization of the time point TP where the encoded data ENC_DATA begins to be received. However, although all the data symbols included in the SOF marker SOF are not observed, the start pattern detector 1373a may recognize that the SOF marker SOF is received based on a noticeable data pattern included in the SOF marker SOF. For example, although the start pattern detector 1373a recognizes only first to $16^{th}$ data symbols of the SOF marker SOF, the start pattern detector 1373a may recognize that the SOF marker SOF is received (because the data pattern including the first to $16^{th}$ data symbols is somewhat noticeable). In this example, the first data pattern may be designed to include the first to $16^{th}$ data symbols.

However, the above example is provided to facilitate better understanding, and not to limit the present disclosure. The first data pattern may be variously changed or modified to include a noticeable data pattern that would be referenced to identify the SOF marker SOF.

The characteristic analyzer 1374a may receive the conversion value CV. The characteristic analyzer 1374a may analyze the reception characteristic of the antenna 1310 of FIG. 1, based on the conversion value CV. More specifically, the characteristic analyzer 1374a may analyze the reception characteristic of the antenna 1310, based on the conversion values CVs corresponding to the data pattern of the SOF marker SOF.

As described above, the conversion value CV may vary depending on the phase difference between the phase of the reception data RX_DATA and the phase of the reference clock REF. Meanwhile, the decoder circuit 1370a may prepare information associated with the data symbols included in the SOF marker SOF in advance. Thus, the characteristic analyzer 1374a may predict a conversion value CV to be received in regards to a specific data symbol. Further, the characteristic analyzer 1374a may analyze the reception characteristic of the antenna 1310 by comparing the predicted conversion value CV with the received conversion value CV.

For example, referring to FIG. 10, a third data symbol of the SOF marker SOF may have a phase of −28°. Thus, the characteristic analyzer 1374a may predict that a conversion value CV corresponding to a phase of −28° will be received in regards to the third data symbol.

However, in some cases, an offset or distortion may occur in the reception characteristic of the antenna 1310. In such a case, the characteristic analyzer 1374a may receive a conversion value CV different from the conversion value CV corresponding to a phase of −28° in regards to the third data symbol. To describe such a reception characteristic, FIGS. 12 to 15 will be referenced together.

FIGS. 12 to 15 are graphs for describing an example reception characteristic of an antenna of a receiver-side device of FIG. 1.

In FIGS. 12 to 15, to facilitate better understanding, it will be assumed that phases of −28°, −24°, −16°, −8°, 0°, +8°, +16°, +24°, and +32° correspond to conversion values CVs of 6, 10, 18, 26, 34, 42, 50, 58, and 66, respectively. Other phases that are not illustrated in FIGS. 12 to 15 may correspond to conversion values CVs that are calculated based on linearity of the above correspondence relationship. For example, a phase of +4° may correspond to a conversion value CV of 38. However, this assumption is only an example, and not intended to limit the present disclosure. A correspondence relationship between a phase of a data symbol and a conversion value CV may be variously changed or modified.

Figure 12:
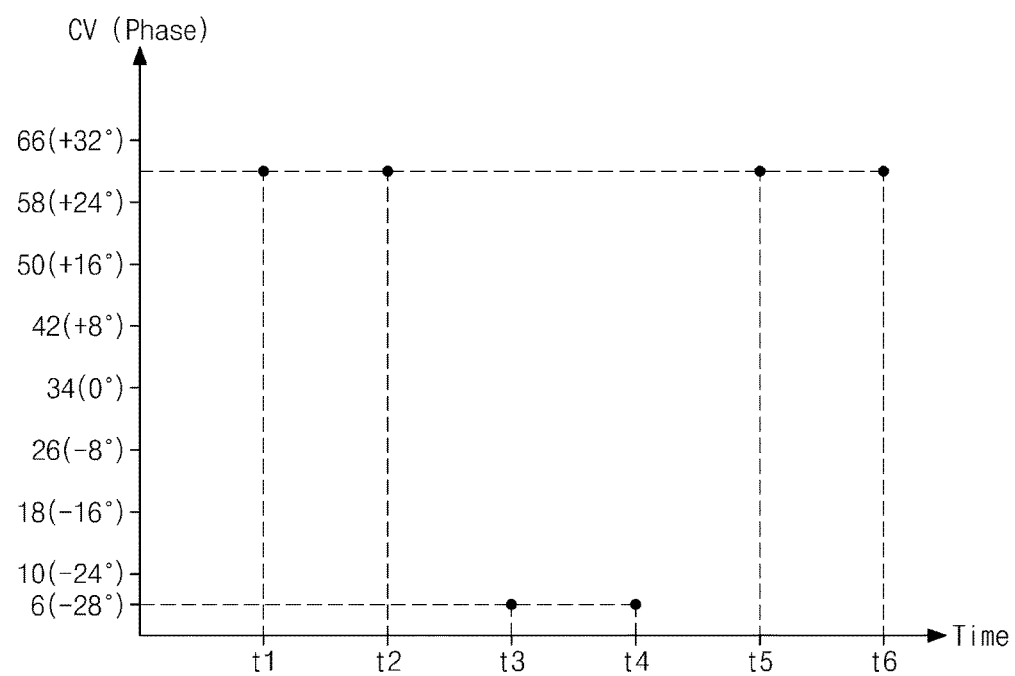
FIGS. 12 to 15 are graphs for describing an example reception characteristic of an antenna of a receiver-side device of FIG. 1.

A graph of FIG. 12 shows a case where first to sixth data symbols of the SOF marker SOF of FIG. 10 are normally received. Referring to FIG. 12, at a time 't1', the receiver-side device 1300 may receive the first data symbol of the SOF marker SOF. Afterwards, the receiver-side device 1300 may receive the second to sixth data symbols of the SOF marker SOF at times 't2' through 't6' respectively.

As assumed with reference to FIG. 10, each of the first data symbol, the second data symbol, the fifth data symbol, and the sixth data symbol may have a phase of +28°. Thus, a conversion value CV corresponding to each of the first data symbol, the second data symbol, the fifth data symbol, and the sixth data symbol may be 62. Meanwhile, each of the third data symbol and the fourth data symbol may have a phase of −28°. Thus, a conversion value CV corresponding to each of the third data symbol and the fourth data symbol may be 6.

When the reception characteristic of the antenna 1310 is normal, the start pattern detector 1373a and the characteristic analyzer 1374a may receive conversion values CVs of 62, 62, 6, 6, 62, and 62 sequentially, in regards to the first to sixth data symbols. However, if an offset or distortion occurs in the reception characteristic of the antenna 1310, the start pattern detector 1373a and the characteristic analyzer 1374a may receive conversion values CV that are different from the sequence of 62, 62, 6, 6, 62, and 62.

Figure 13:
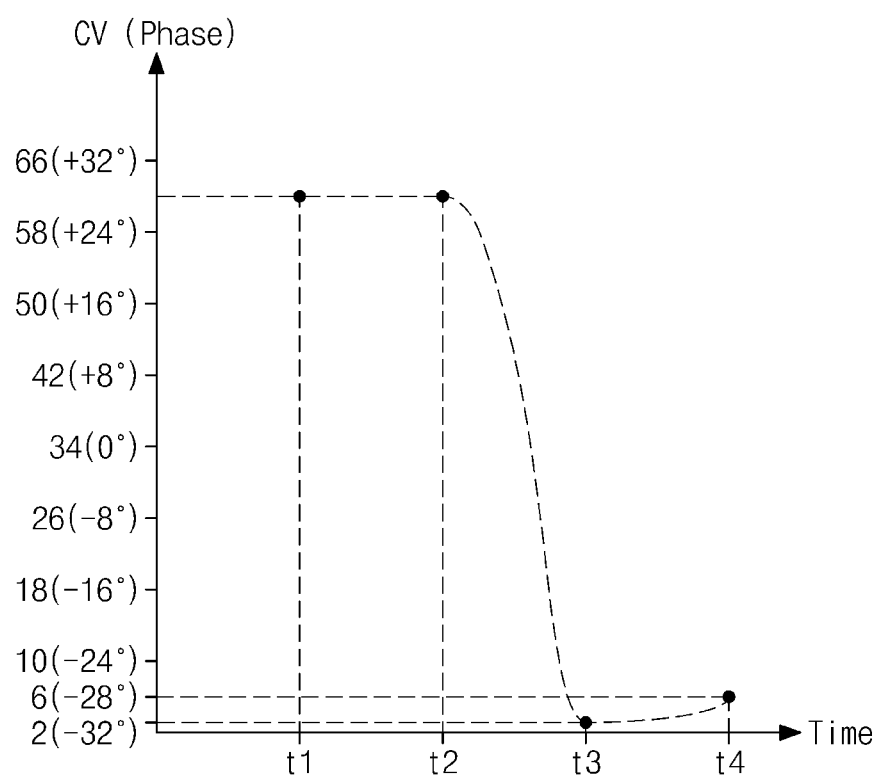

For example, a graph of FIG. 13 shows a case where a phase of the reception data RX_DATA decreases below a target value (i.e., a case where the phase of the reception data RX_DATA is "under-damped") during a time interval in which the phase of the reception data RX_DATA is decreasing.

For example, when a communication condition (e.g., a distance between the antennas 1170 and 1310, a quality factor of the antenna 1310, and/or the like) is changed, an offset or distortion may occur in the reception characteristic of the antenna 1310. When the reception characteristic of the antenna 1310 is changed, for example, the third data symbol having a phase of −32° (which is distorted) may be received at a time 't3'. Thus, a conversion value CV of 2 corresponding to the phase of −32° may be generated. However, an originally intended conversion value CV for the third data symbol may be 6. This error may affect reliability and performance of communication.

The characteristic analyzer 1374a may analyze the reception characteristic of the antenna 1310. For example, the characteristic analyzer 1374a may collect information associated with an 'under-damping rate' of a phase. For example, a normal change for the conversion value CV between a time 't2' and a time 't3' may be 56 (=62−6), while an actual change for the conversion value CV may be 60 (=62−2). In this example, the characteristic analyzer 1374a may calculate an under-damping rate of 7.14% (=100%×(60−56)/56).

An under-damping rate exceeding 0% may mean that an offset or distortion occurs in the reception characteristic of the antenna 1310. When an under-damping rate exceeds 0%, a phase of the reception data RX_DATA may decrease below a target value (i.e., an originally intended value) during a time interval in which the phase of the reception data RX_DATA is decreasing. The characteristic analyzer 1374a may collect information associated with whether the phase of the reception data RX_DATA is under-damped, based on a value of the under-damping rate.

Figure 14:
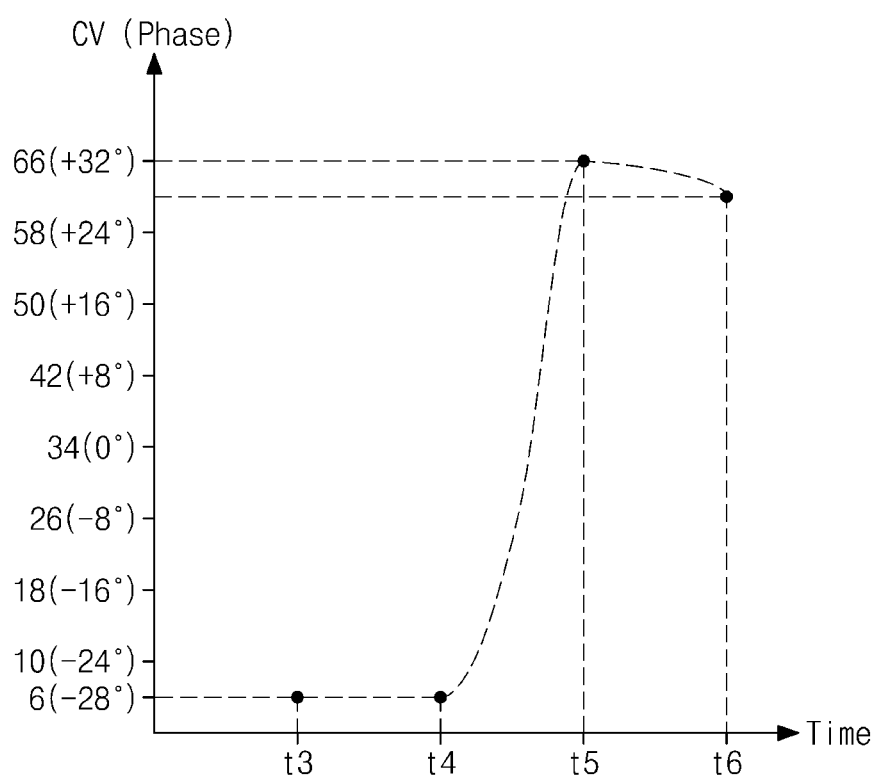

For another example, a graph of FIG. 14 shows a case where a phase of the reception data RX_DATA increases over a target value (i.e., a case where the phase of the reception data RX_DATA is "over-damped") during a time interval in which the phase of the reception data RX_DATA is increasing.

When the reception characteristic of the antenna 1310 is changed, for example, the fifth data symbol having a phase of +32° (which is distorted) may be received at a time 't5'. Thus, a conversion value CV of 66 corresponding to the phase of +32° may be generated. However, an originally intended conversion value CV in regards to the fifth data symbol may be 62.

The characteristic analyzer 1374a may analyze the reception characteristic of the antenna 1310. For example, the characteristic analyzer 1374a may collect information associated with an 'over-damping rate' of a phase. For example, a normal change for the conversion value CV between a time 't4' and a time 't5' may be 56 (=62−6), while an actual change for the conversion value CV may be 60 (=66−6). In this example, the characteristic analyzer 1374a may calculate an over-damping rate of 7.14% (=100%×(60−56)/56).

An over-damping rate exceeding 0% may mean that an offset or distortion occurs in the reception characteristic of the antenna 1310. When an over-damping rate exceeds 0%, a phase of the reception data RX_DATA may increase over a target value (i.e., an originally intended value) during a time interval in which the phase of the reception data RX_DATA is increasing. The characteristic analyzer 1374a may collect information associated with whether the phase of the reception data RX_DATA is over-damped, based on a value of the over-damping rate.

Figure 15:
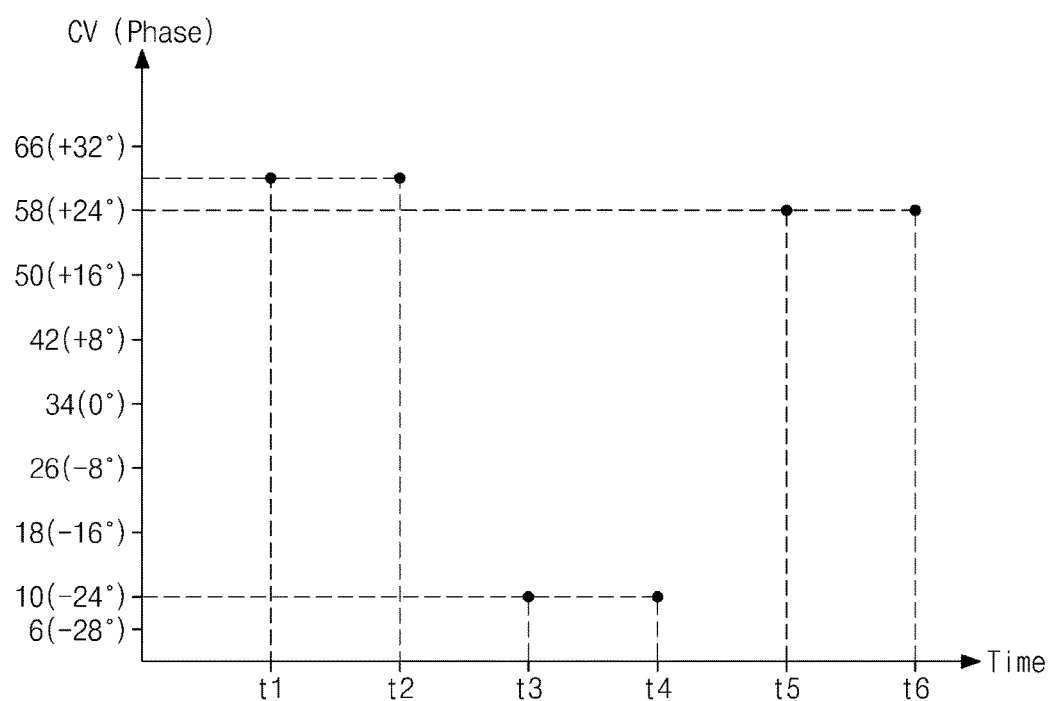

For still another example, a graph of FIG. 15 shows a case where a difference between conversion values corresponding to adjacent data symbols in the reception data RX_DATA is changed.

According to the originally intended assumption, the adjacent data symbols may be distinguished based on a phase interval PI of 4° (refer to FIG. 3), and a difference between the conversion values corresponding to the adjacent data symbols may be 4. However, if the reception characteristic of the antenna 1310 is changed, the phase interval PI (and the difference between the conversion values) that is referred to distinguish the adjacent data symbols may be changed.

A conversion value CV corresponding to the second data symbol received at a time 't2' may be 62. An originally intended conversion value CV for each of the third data symbol and the fourth data symbol respectively received at a time 't3' and a time 't4' may be 6. However, when the reception characteristic of the antenna 1310 is changed, the third and fourth data symbols having a phase of −24° (which is distorted) may be received. Thus, a conversion value CV of 10 corresponding to the phase of −24° may be generated.

Fourteen (14) phase intervals PIs may be provided between the second data symbol received at the time 't2' and the third data symbol received at the time 't3'. According to the originally intended assumption, the difference between conversion values CVs corresponding to the adjacent data symbols may be 4 (=(62−6)/14). However, if the reception characteristic of the antenna 1310 is changed, the difference between conversion values CVs corresponding to the adjacent data symbols may be changed to 3.71 (=(62−10)/14).

Similarly, an originally intended conversion value CV for each of the fifth data symbol received at a time 't5' and the sixth data symbol received at a time 't6' may be 62. However, when the reception characteristic of the antenna 1310 is changed, the fifth and sixth data symbols having a phase of +24° may be received. Thus, a conversion value CV of 58 corresponding to a phase of +24° may be generated.

Fourteen (14) phase intervals PIs may be provided between the fourth data symbol received at the time 't4' and the fifth data symbol received at the time 't5'. According to the originally intended assumption, the difference between conversion values CVs corresponding to the adjacent data symbols may be 4 (=(62−6)/14). However, if the reception characteristic of the antenna 1310 is changed, the difference between conversion values CVs corresponding to the adjacent data symbols may be changed to 3.43 (=(58−10)/14).

The characteristic analyzer 1374a may analyze the reception characteristic of the antenna 1310. The characteristic analyzer 1374a may collect information associated with whether the difference between conversion values CVs corresponding to the adjacent data symbols is changed.

As described with reference to FIGS. 12 to 15, the characteristic analyzer 1374a may analyze the reception characteristic of the antenna 1310 and may collect related information. For example, the reception characteristic of the antenna 1310 may be associated with at least one of under-damping of a phase of the reception data RX_DATA, over-damping of a phase of the reception data RX_DATA, and a difference between conversion values corresponding to the adjacent data symbols. However, these examples are provided to facilitate better understanding, and not intended to limit the present disclosure. The characteristic analyzer 1374a may further analyze various other reception characteristics of the antenna 1310.

In some cases, the reception characteristic with respect to a time interval in which a phase of the reception data RX_DATA is decreasing may be different from the reception characteristic with respect to a time interval in which a phase of the reception data RX_DATA is increasing. For example, as described with reference to FIG. 15, a difference between conversion values CVs corresponding to the adjacent data symbols at a time interval in which a phase of the reception data RX_DATA is decreasing may be different from a difference between conversion values CVs corresponding to the adjacent data symbols at a time interval in which a phase of the reception data RX_DATA is increasing. For example, a value of the under-damping rate described with reference to FIG. 13 may be different from a value of the over-damping rate described with reference to FIG. 14. Thus, in some example embodiments, the characteristic analyzer 1374a may separately analyze the reception characteristic with respect to a time interval in which a phase of the reception data RX_DATA is decreasing and the reception characteristic with respect to a time interval in which a phase of the reception data RX_DATA is increasing.

Referring back to FIG. 11, the characteristic analyzer 1374a may receive the conversion value CV to analyze the reception characteristic described above. When the start pattern detector 1373a detects the SOF marker SOF, the characteristic analyzer 1374a may analyze the reception characteristic(s) in response to detecting the SOF marker SOF.

Meanwhile, whenever the reception data RX_DATA is received, a communication environment may be changed and a reception characteristic of the antenna 1310 may be changed. Accordingly, in some example embodiments, the characteristic analyzer 1374a may analyze the reception characteristic of the antenna 1310 whenever the start pattern detector 1373a detects the SOF marker SOF (i.e., whenever the reception data RX_DATA is received).

In some example embodiments, the characteristic analyzer 1374a may receive a second data pattern included in the SOF marker SOF. The second data pattern of the SOF marker SOF may follow the first data pattern, and may not overlap the first data pattern. Referring to FIG. 10 together, when the first data pattern includes the first to $16^{th}$ data symbols, the second data pattern may include the $17^{th}$ to $68^{th}$ data symbols. However, the present disclosure is not limited to this example, and the second data pattern may be variously changed or modified.

In the above example embodiment, the characteristic analyzer 1374a may analyze the reception characteristic, based on phase differences between phases of the second data pattern and a phase of the reference clock REF. In other words, the characteristic analyzer 1374a may analyze the reception characteristic based on conversion values CVs corresponding to the second data pattern. When the start pattern detector 1373a detects the first data pattern, the characteristic analyzer 1374a may operate based on the second data pattern that follows the first data pattern.

Referring to FIG. 10 together, when the first data pattern includes the first to $16^{th}$ data symbols and the second data pattern includes the $17^{th}$ to $68^{th}$ data symbols, the SOF marker SOF may further include a third data pattern that does not overlap the first and second data patterns. For example, the third data pattern may follow the second data pattern, and may include $68^{th}$ to $140^{th}$ data symbols.

In some example embodiments, after analyzing the reception characteristic based on the second data pattern, the characteristic analyzer 1374a may wait for completion of the SOF marker SOF while the third data pattern is received. To determine synchronization of a time point (TP) where the encoded data ENC_DATA begins to be received, the characteristic analyzer 1374a may simply wait for completion of the SOF marker SOF.

In some example embodiments, the characteristic analyzer 1374a may verify the analyzed reception characteristic, based on conversion values CVs corresponding to the third data pattern. The characteristic analyzer 1374a may apply the analyzed reception characteristic to the third data pattern, and may check whether the reception characteristic of the antenna 1310 is accurately analyzed. If an error exists in the analyzed reception characteristic, the characteristic analyzer 1374a may correct/calibrate the analyzed reception characteristic while the third data pattern is received.

The decoder 1375a may receive the conversion value CV. The decoder 1375a may decode the conversion value CV that corresponds to the encoded data ENC_DATA following the SOF marker SOF in the reception data RX_DATA. For example, the encoded data ENC_DATA may follow the third data pattern of the SOF marker SOF, and may not overlap the first to third data patterns. The decoder 1375a may decode the conversion value CV corresponding to the encoded data ENC_DATA, in response to completion of the third data pattern.

The decoder 1375a may generate a reception digital value RX_DV by decoding the conversion value CV. The decoder 1375a may generate the reception digital value RX_DV that corresponds to a phase difference between a phase of the encoded data ENC_DATA following the SOF marker SOF in the reception data RX_DATA and a phase of the reference clock REF.

As described with reference to FIGS. 12 to 15, when the reception characteristic of the antenna 1310 is changed, the conversion value CV may be different from an originally intended value. Thus, the decoder 1375a may decode the conversion value CV with reference to the reception characteristic analyzed by the characteristic analyzer 1374a.

In some example embodiments, the decoder 1375a may compensate conversion values CVs that corresponds to some data symbols of the encoded data ENC_DATA, based on the reception characteristic analyzed by the characteristic analyzer 1374a. The decoder 1375a may decode the compensated conversion value CV into the reception digital value RX_DV.

For example, as described with reference to FIGS. 13 and 14, a phase of the reception data RX_DATA may be under-damped or over-damped. The decoder 1375a may adjust (e.g., compensate) some conversion values CVs to an originally intended value, in consideration of an under-damping rate and/or an over-damping rate. The decoder 1375a may generate the reception digital value RX_DV by decoding the adjusted conversion value CV. For example, as described with reference to FIG. 15, a difference between conversion values CV corresponding to the adjacent data symbols may be changed. In consideration of this change, the decoder 1375a may decode the conversion value CV into the reception digital value RX_DV.

In some example embodiments, the decoder 1375a may not refer to the reception characteristic analyzed by the characteristic analyzer 1374a. For example, when an over-damping rate or an under-damping rate is below a reference value (i.e., negligible), the decoder 1375a may perform a decoding operation without referring to such the reception characteristic.

In some example embodiments, the decoder circuit 1370a may further include a memory 1377a. The memory 1377a may store data used in an operation of the decoder circuit 1370a temporarily or semi-permanently. To this end, the memory 1377a may include a volatile memory such as a static random access memory (SRAM), a dynamic RAM (DRAM), or the like, and/or a nonvolatile memory such as a flash memory, a phase-change RAM (PRAM), a magnetic-resistive RAM (MRAM), a resistive RAM (ReRAM), a ferroelectric RAM (FRAM), or the like.

For example, the memory 1377a may store information associated with data symbols included in the SOF marker SOF. The start pattern detector 1373a and the characteristic analyzer 1374a may operate with reference to the information stored in the memory 1377a. For example, the memory 1377a may store information associated with the reception characteristic analyzed by the characteristic analyzer 1374a. The decoder 1375a may operate with reference to the information stored in the memory 1377a.

In some example embodiments, the decoder circuit 1370a may further include an end pattern detector 1379a. The end pattern detector 1379a may receive the conversion value CV. The end pattern detector 1379a may detect a data pattern of the EOF marker EOF, based on the conversion value CV. As described above, the EOF marker EOF may include predetermined data symbols. Thus, the end pattern detector 1379a may detect whether the EOF marker EOF is received, with reference to a varying conversion value CV.

Receiving the EOF marker EOF may indicate completion of the encoded data ENC_DATA. Thus, when the EOF marker EOF is received, the decoder 1375a may finish a decoding operation. The decoder 1375a may finish decoding in response to detecting the EOF marker EOF with the end pattern detector 1379a.

Figure 16:
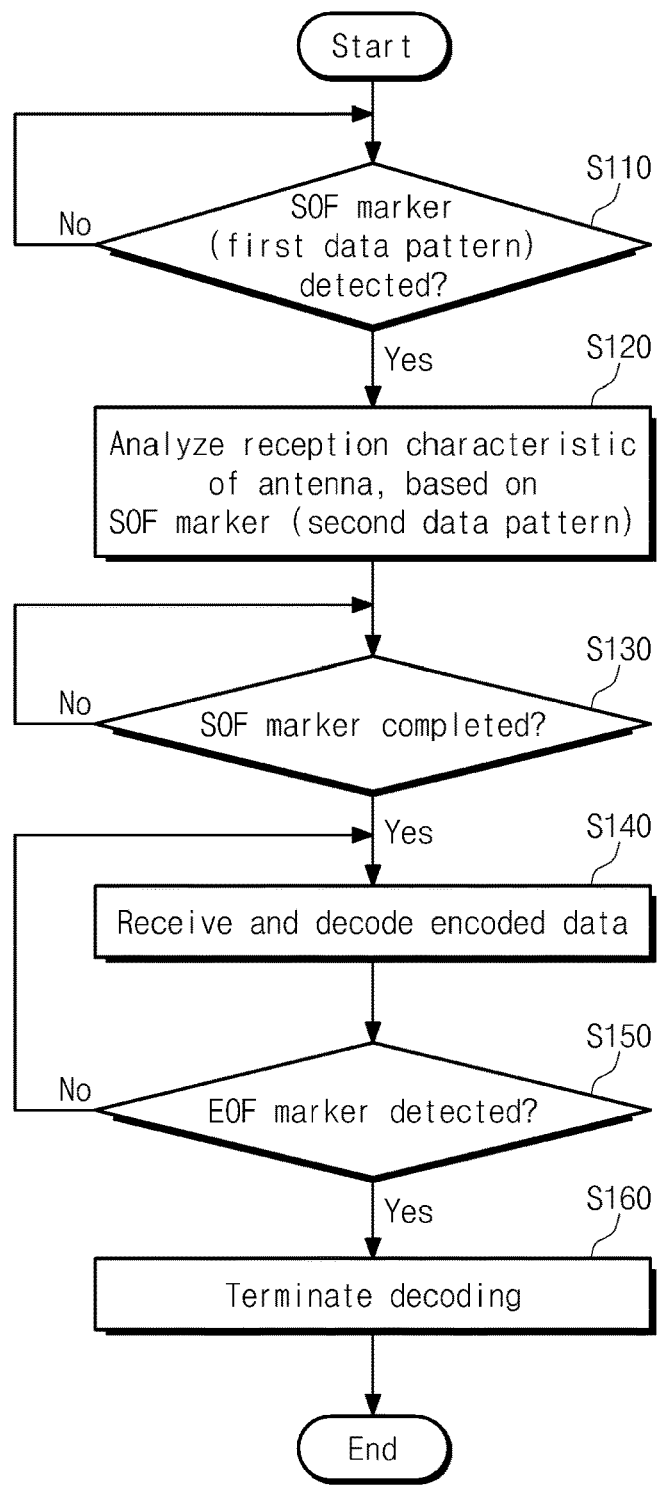
FIG. 16 is a flowchart describing an example operation of a decoder circuit of FIG. 5.

FIG. 16 is a flowchart describing an example operation of a decoder circuit of FIG. 5. To facilitate better understanding, FIGS. 5 and 11 will be referenced together with FIG. 16.

In operation S110, the start pattern detector 1373a of the decoder circuit 1370 may detect whether the SOF marker SOF is received. In some example embodiments, the start pattern detector 1373a may detect a first data pattern of the SOF marker SOF. When the SOF marker SOF is not detected, the decoder circuit 1370 may wait until the SOF marker SOF is detected. On the other hand, when the SOF marker SOF is detected, operation S120 may be performed.

In operation S120, the characteristic analyzer 1374a of the decoder circuit 1370 may analyze a reception characteristic of the antenna 1310 based on the SOF marker SOF. In some example embodiments, the characteristic analyzer 1374a may analyze the reception characteristic based on a second data pattern of the SOF marker SOF.

In operation S130, the decoder circuit 1370 may determine whether the SOF marker SOF is completed, according to a control of the start pattern detector 1373a and/or the characteristic analyzer 1374a. When the SOF marker SOF is not completed, the characteristic analyzer 1374a may wait until the SOF marker SOF is completed or may correct/calibrate the analyzed reception characteristic. On the other hand, when the SOF marker SOF is completed, operation S140 may be performed.

In operation S140, the decoder 1375a of the decoder circuit 1370 may receive the encoded data ENC_DATA. The decoder 1375a may decode the encoded data ENC_DATA. In some example embodiments, the decoder 1375a may decode the encoded data ENC_DATA into a reception digital value RX_DV with reference to the reception characteristic analyzed in operation S120.

In operation S150, the end pattern detector 1379a of the decoder circuit 1370 may detect whether the EOF marker EOF is received. When the EOF marker EOF is not detected, the decoder 1375a may continuously decode the encoded data ENC_DATA in operation S140. On the other hand, when the EOF marker EOF is detected, the decoder 1375a may finish a decoding operation in operation S160.

In the example embodiments, a decoding operation may be performed based on a reception characteristic (e.g., a reception characteristic of the antenna 1310). Thus, although an offset or distortion occurs in the reception characteristic due to a change of a communication environment, the decoding operation may be accurately performed. Consequently, communication between electronic devices may be performed rapidly and stably.

Figure 17:
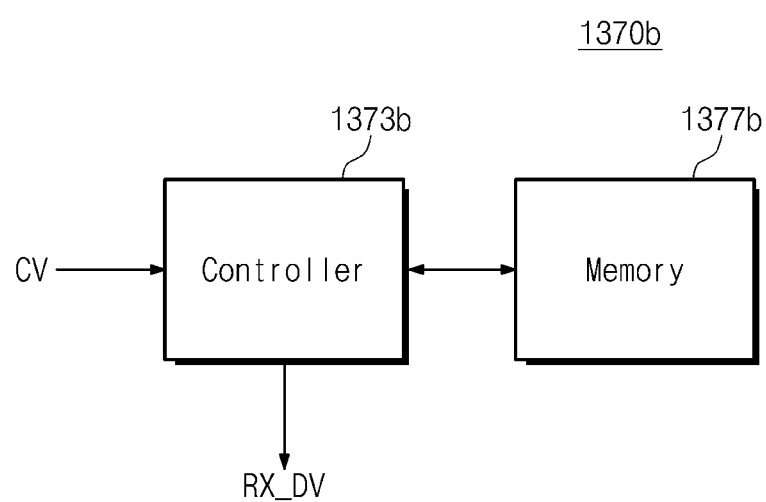
FIG. 17 is a block diagram illustrating an example configuration of a decoder circuit of FIG. 5.

FIG. 17 is a block diagram illustrating an example configuration of a decoder circuit of FIG. 5. In some example embodiments, a decoder circuit 1370b may include a controller 1373b and a memory 1377b. In some example embodiments, the decoder circuit 1370 of FIG. 5 may include the decoder circuit 1370b of FIG. 17.

As described with reference to FIG. 11, the decoder circuit 1370 of FIG. 5 may include the start pattern detector 1373a, the characteristic analyzer 1374a, the decoder 1375a, and the end pattern detector 1379a. The start pattern detector 1373a, the characteristic analyzer 1374a, the decoder 1375a, and the end pattern detector 1379a of FIG. 11 may include one or more analog circuits/logic circuits to provide the operations described with reference to FIG. 11. That is, the start pattern detector 1373a, the characteristic analyzer 1374a, the decoder 1375a, and the end pattern detector 1379a of FIG. 11 may be implemented in hardware.

Meanwhile, in some example embodiments, the start pattern detector 1373a, the characteristic analyzer 1374a, the decoder 1375a, and the end pattern detector 1379a of FIG. 11 may be implemented in software. FIG. 17 may describe such example embodiments.

The controller 1373b may include one or more processors. A processor of the controller 1373b may execute an instruction set generated by compiling/interpreting a program code. To this end, the processor of the controller 1373b may be embodied to include a special-purpose logic circuit (e.g., field programmable gate array (FPGA), application specific integrated circuits (ASICs), and/or the like).

The memory 1377b may store data used in an operation of the decoder circuit 1370b temporarily or semi-permanently. To this end, the memory 1377b may include a volatile memory such as an SRAM, a DRAM, or the like and/or a nonvolatile memory such as a PRAM, an MRAM, an ReRAM, an FRAM, or the like.

For example, the memory 1377b may store a program code executed by the processor of the controller 1373b. For example, the memory 1377b may store data processed or to be processed by the processor of the controller 1373b.

The processor of the controller 1373b may provide the operations of the start pattern detector 1373a, the characteristic analyzer 1374a, the decoder 1375a, and the end pattern detector 1379a described with reference to FIG. 11, by executing the program code stored in the memory 1377b. Thus, the controller 1373b may detect a data pattern of the SOF marker SOF, and may analyze a reception characteristic. Further, the controller 1373b may decode a conversion value CV based on the analyzed reception characteristic to generate a reception digital value RX_DV, and may detect a data pattern of the EOF marker EOF. To this end, the memory 1377b may store information associated with data symbols included in the SOF marker SOF and the EOF marker EOF, and information associated with the reception characteristic analyzed by the controller 1373b.

In some example embodiments, the start pattern detector 1373a, the characteristic analyzer 1374a, the decoder 1375a, and the end pattern detector 1379a of FIG. 11 may be implemented in a hybrid form of hardware and software. The configuration of the decoder circuit 1370 of FIG. 5 may be variously changed or modified, and the present disclosure is not limited to the accompanied drawings.

Figure 18:
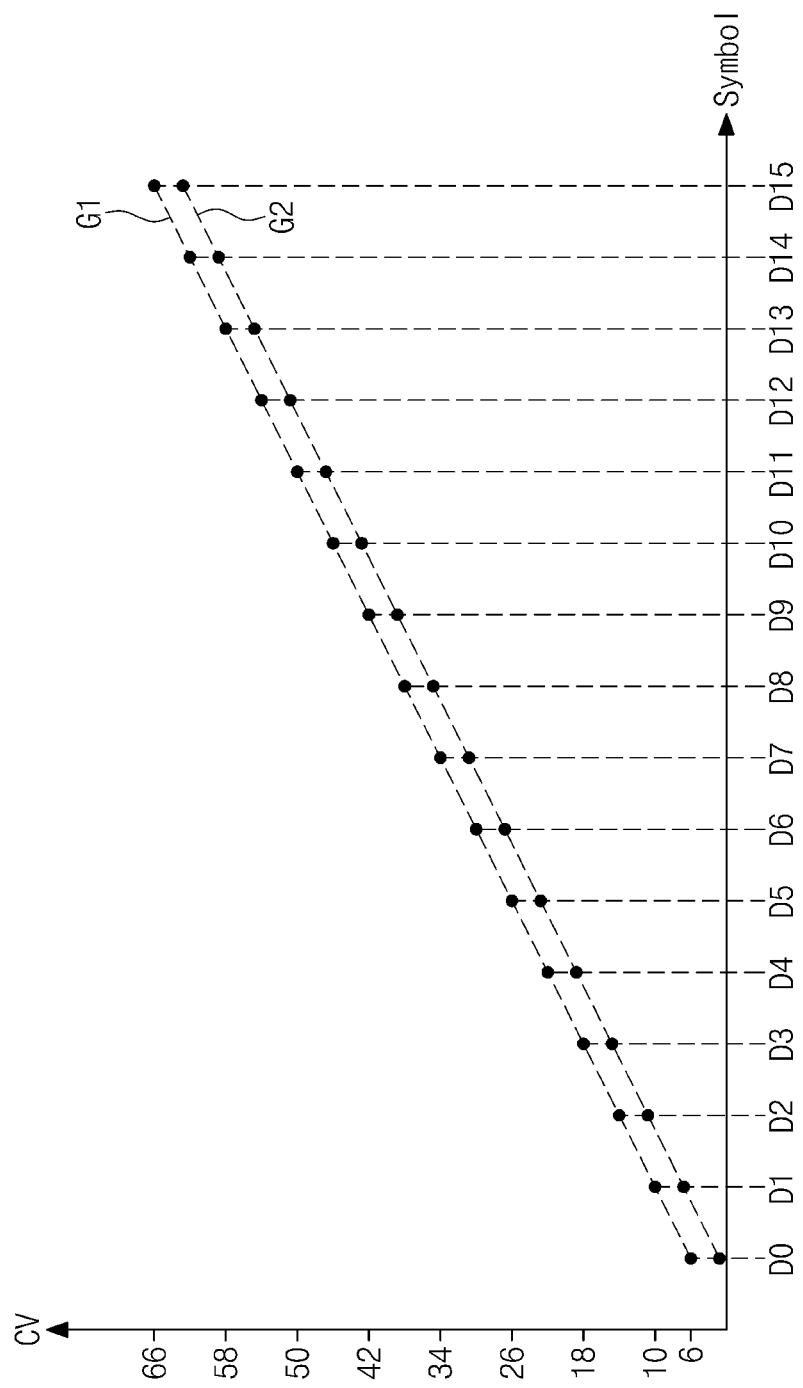
FIGS. 18 and 19 are graphs for describing an offset of a conversion value generated by a phase-to-digital converter circuit of FIG. 5.
Figure 19:
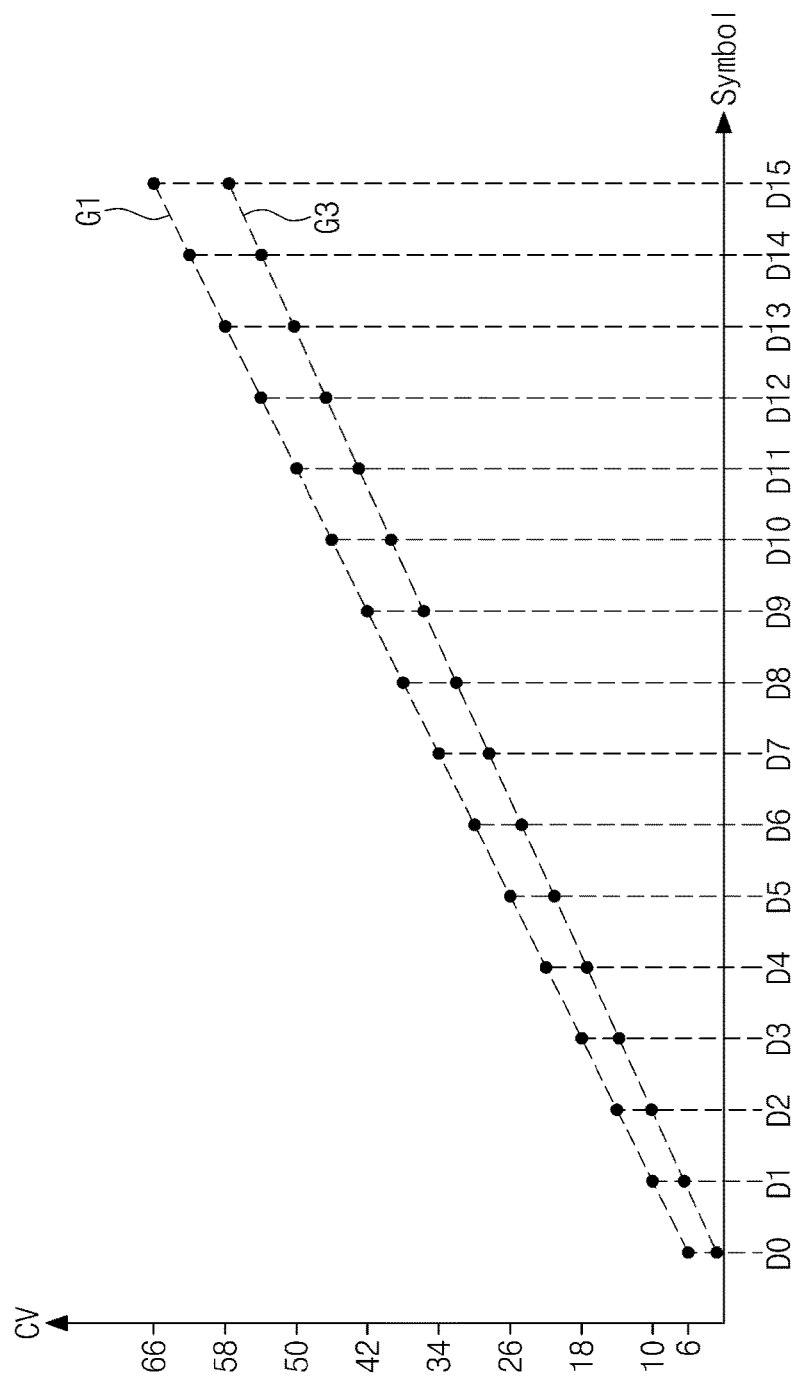

FIGS. 18 and 19 are graphs for describing an offset of a conversion value generated by a phase-to-digital converter circuit of FIG. 5.

Referring to FIG. 18 first, a graph of FIG. 18 shows two lines G1 and G2. The two lines G1 and G2 indicate a correspondence relationship between data symbols D0 to D15 and conversion values CVs.

The first line G1 indicates a correspondence relationship that is based on the examples of FIGS. 3 and 12. Referring to the first line G1, according to the examples of FIGS. 3 and 12, the data symbols D0 to D15 may correspond to the conversion values CVs of 6, 10, 14, 18, 22, 26, 30, 34, 38, 42, 46, 50, 54, 58, 62, and 66, respectively.

In some cases, an offset of the conversion value CV may occur. For example, when the clock recovery circuit 1340 described with reference to FIG. 6 is employed, a reference clock REF having a substantially constant phase may be generated. However, a phase of the reception data RX_DATA may be changed with a lapse of time, and a phase of the reference clock REF may somewhat fluctuate to correspond to an average of phases of data symbols included in the reception data RX_DATA.

In addition, when an operation time of the clock recovery circuit 1340 becomes long, charges in the capacitor C may be leaked little by little. Thus, a phase of the reference clock REF may lag little by little. Due to these reasons, the offset of the conversion value CV may occur.

The second line G2 indicates a correspondence relationship between the data symbols D0 to D15 and the offset conversion values CVs. Referring to the second line G2, for example, the data symbols D0 to D15 may correspond to conversion values CVs of 3, 7, 11, 15, 19, 23, 27, 31, 35, 39, 43, 47, 51, 55, 59, and 63, respectively. In some cases, the second line G2 may move along a positive direction or a negative direction of the CV axis depending on a level/direction of the offset.

Referring to FIG. 19 next, a graph of FIG. 19 shows two lines G1 and G3. The two lines G1 and G3 indicate a correspondence relationship between data symbols D0 to D15 and conversion values CVs. Similar to FIG. 18, the first line G1 indicates a correspondence relationship based on the examples of FIGS. 3 and 12.

Meanwhile, the third line G3 indicates a correspondence relationship between the data symbols D0 to D15 and the offset conversion values CVs. A slope of the third line G3 may be different from a slope of the first line G1. For example, when a communication condition (e.g., a distance between the antennas 1170 and 1310, a quality factor of the antenna 1310, and/or the like) is changed, the correspondence relationship between the data symbols D0 to D15 and the conversion values CVs may be changed. Thus, the third line G3 having a changed slope may be obtained.

When the correspondence relationship illustrated in FIG. 18 or 19 is observed due to the offset conversion values CVs, it may be difficult to accurately and rapidly decode the reception data RX_DATA. Thus, in some example embodiments, a configuration that will be described with reference to FIG. 20 may be employed.

Figure 20:
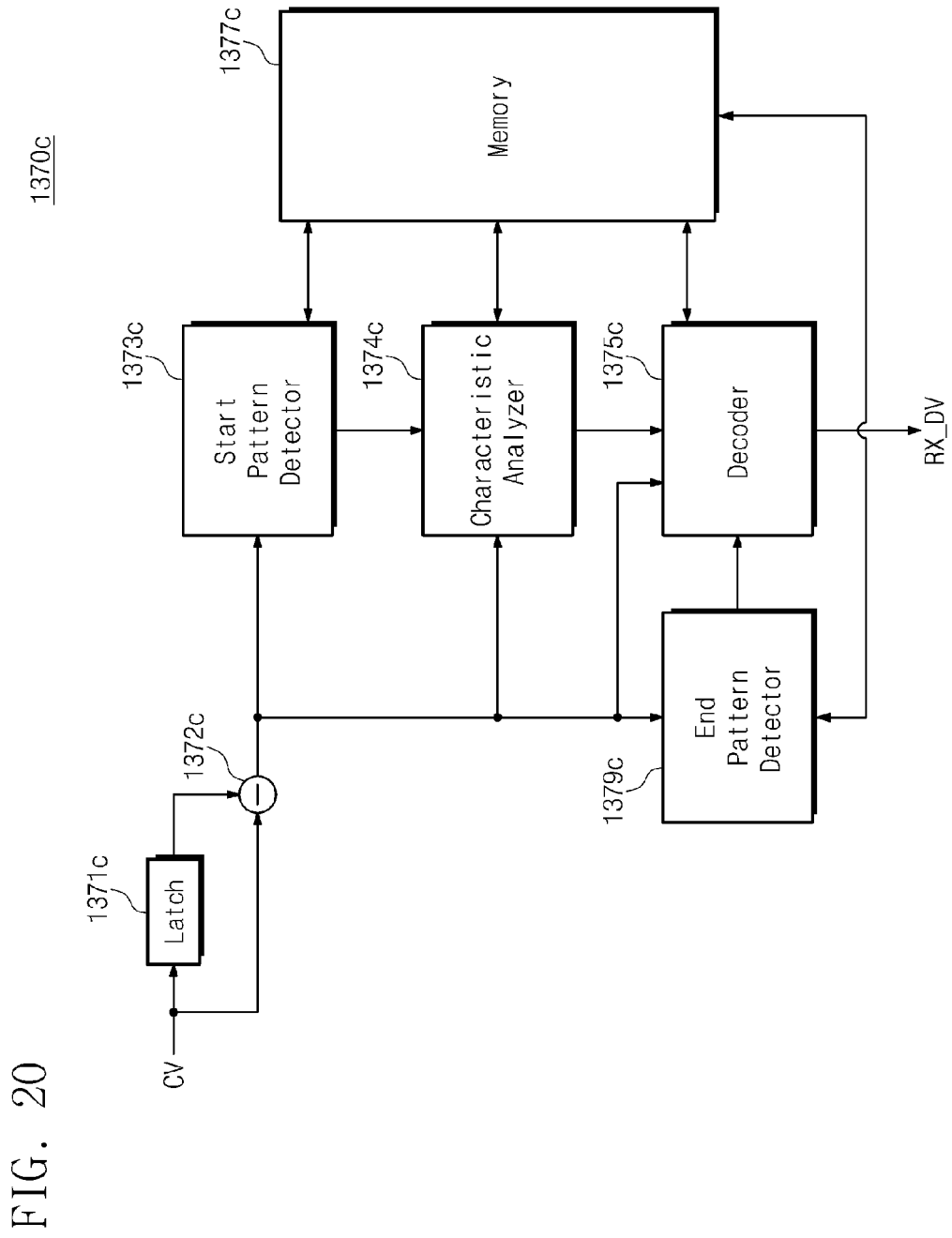
FIG. 20 is a block diagram illustrating an example configuration of a decoder circuit of FIG. 5.

FIG. 20 is a block diagram illustrating an example configuration of a decoder circuit of FIG. 5. In some example embodiments, a decoder circuit 1370c may include a latch 1371c, a subtractor 1372c, a start pattern detector 1373c, a characteristic analyzer 1374c, a decoder 1375c, and a memory 1377c. In some example embodiments, the decoder circuit 1370 of FIG. 5 may include the decoder circuit 1370c of FIG. 20.

The start pattern detector 1373c, the characteristic analyzer 1374c, the decoder 1375c, and the memory 1377c may be configured and operate substantially the same as or similar to the start pattern detector 1373a, the characteristic analyzer 1374a, the decoder 1375a, and the memory 1377a of FIG. 11. Thus, for brevity, redundant descriptions for the start pattern detector 1373c, the characteristic analyzer 1374c, the decoder 1375c, and the memory 1377c will be omitted below.

The latch 1371c may receive a conversion value CV. The latch 1371c may store the conversion value CV, for example, during one symbol period. The conversion value CV stored in the latch 1371c may be provided to the subtractor 1372c at the next symbol period.

The subtractor 1372c may receive the conversion value CV. Further, the subtractor 1372c may receive the conversion value CV stored in the latch 1371c. The subtractor 1372c may calculate a difference between the currently received conversion value CV and the conversion value CV received from the latch 1371c. That is, the subtractor 1372c may calculate a difference between the currently received conversion value CV and the conversion value CV of the previous symbol period.

For example, the latch 1371c may store a first conversion value corresponding to a phase difference with respect to a first data symbol included in the reception data RX_DATA, at a first symbol period. The latch 1371c may store the first conversion value during the first symbol period. Further, the latch 1371c may provide the first conversion value to the subtractor 1372c at a second symbol period following the first symbol period.

For example, the subtractor 1372c may receive a second conversion value corresponding to a phase difference with respect to a second data symbol following the first data symbol in the reception data RX_DATA, at the second symbol period. That is, the subtractor 1372c may receive the second conversion value together the first conversion value, at the second symbol period. The subtractor 1372c may calculate a difference between the first conversion value and the second conversion value.

The difference calculated by the subtractor 1372c may be provided to the start pattern detector 1373a, the characteristic analyzer 1374a, and the decoder 1375a. The start pattern detector 1373a, the characteristic analyzer 1374a, and the decoder 1375a may receive the difference between the first conversion value and the second conversion value instead of directly receiving the conversion value CV.

In such example embodiments, the start pattern detector 1373c may detect the SOF marker SOF (e.g., may detect a first data pattern of the SOF marker SOF) based on the difference between the first conversion value and the second conversion value. The characteristic pattern detector 1373c may analyze a reception characteristic of the antenna 1310 based on the difference between the first conversion value and the second conversion value. The decoder 1375c may generate a reception digital value RX_DV based on the difference between the first conversion value and the second conversion value. Thus, the decoder circuit 1370c may decode the difference between the first conversion value corresponding to the first data symbol and the second conversion value corresponding to the second data symbol into the reception digital value RX_DV.

Figure 21:
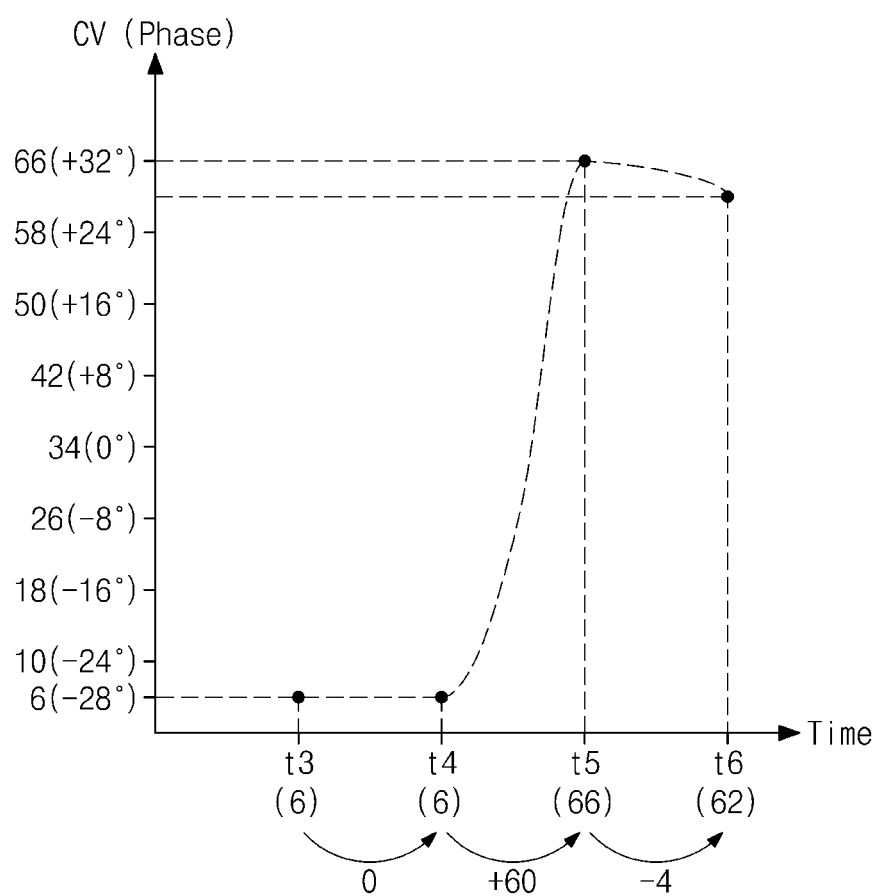
FIG. 21 is a graph for describing an example operation of a decoder circuit of FIG. 20.

FIG. 21 is a graph for describing an example operation of a decoder circuit of FIG. 20. To facilitate better understanding, FIG. 20 will be referenced together with FIG. 21.

FIG. 21 shows, similarly to FIG. 14, a case where a phase of the reception data RX_DATA is over-damped. For example, the decoder circuit 1370c may receive conversion values CV of 6, 6, 66, and 62 at times 't3' to 't6', respectively.

As described with reference to FIG. 20, the decoder circuit 1370c may operate based on a difference between a conversion value corresponding to a current data symbol and a conversion value corresponding to a previous data symbol, instead of the conversion value CV itself. For example, the decoder circuit 1370c may decode a difference between a conversion value CV of 6 received at the time 't3' and a conversion value CV of 6 received at the time 't4' (e.g., 0=6−6), instead of decoding the conversion value CV of 6 received at the time 't4', to generate the reception digital value RX_DV.

Similarly, for example, the decoder circuit 1370c may decode a difference between the conversion value CV of 6 received at the time 't4' and a conversion value CV of 66 received at the time 't5' (e.g., +60=66−6), instead of decoding the conversion value CV of 66 received at the time 't5', to generate the reception digital value RX_DV. Further, the decoder circuit 1370c may decode a difference between the conversion value CV of 66 received at the time 't5' and a conversion value CV of 62 received at the time 't6' (e.g., −4=62−66), instead of decoding the conversion value CV of 62 received at the time 't6', to generate the reception digital value RX_DV.

Although the offset described with reference to FIG. 18 occurs, the difference between the conversion value corresponding to the current data symbol and the conversion value corresponding to the previous data symbol may be constant. When the offset described with reference to FIG. 19 occurs, the difference between the conversion value corresponding to the current data symbol and the conversion value corresponding to the previous data symbol may increase in proportion to a symbol sequence. Thus, when the decoder circuit 1370c operates based on the difference between the conversion value corresponding to the current data symbol and the conversion value corresponding to the previous data symbol, the reception data RX_DATA may be decoded stably and rapidly, even if the offset occurs.

Figure 22:
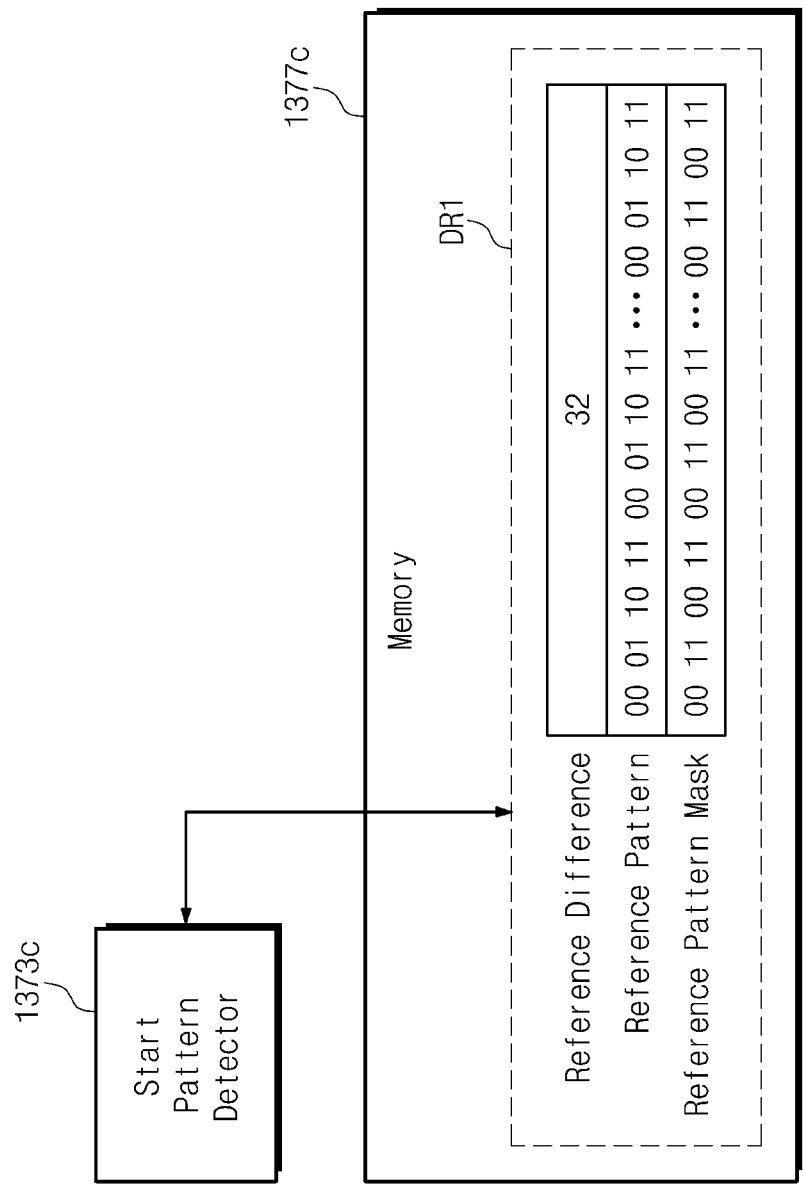
FIGS. 22 and 23 are conceptual diagrams for describing example operations of a decoder circuit of FIG. 20.

FIG. 22 is a conceptual diagram for describing an example operation of a decoder circuit of FIG. 20. FIG. 22 illustrates an example of detecting the SOF marker SOF in the decoder circuit 1370c.

The memory 1377c may store detection reference information DR1 that is referenced to detect the SOF marker SOF. The start pattern detector 1373c may detect the SOF marker SOF based on the detection reference information DR1.

For example, the detection reference information DR1 may include a value of a reference difference. The reference difference may be compared with a difference between a first conversion value corresponding to a previous data symbol and a second conversion value corresponding to a current data symbol.

For example, the start pattern detector 1373c may determine whether the difference between the first conversion value and the second conversion value is greater than the reference difference. Thus, the start pattern detector 1373c may detect whether a phase of the reception data RX_DATA increases as much as or more than the reference difference in a positive direction. The start pattern detector 1373c may also detect whether a phase of the reception data RX_DATA decreases as much as or more than the reference difference in a negative direction.

For example, the detection reference information DR1 may include a value of a reference pattern. The reference pattern may be compared with a change pattern of the difference between the first conversion value and the second conversion value.

For example, in the reference pattern, a value of '01' may mean that the difference between the first conversion value and the second conversion value is greater than the reference difference in a positive direction, and a value of '00' may mean that the difference between the first conversion value and the second conversion value is smaller than the reference difference in a positive direction. For example, in the reference pattern, a value of '11' may mean that the difference between the first conversion value and the second conversion value is greater than the reference difference in a negative direction, and a value of '10' may mean that the difference between the first conversion value and the second conversion value is smaller than the reference difference in a negative direction.

The start pattern detector 1373c may detect whether the reference pattern is observed, to detect the SOF marker SOF. According to the example illustrated in FIG. 22, the start pattern detector 1373c may sequentially detect (a) whether a difference calculated by the subtractor 1372c of FIG. 20 is less than 32 in a positive direction ('00'), (b) whether the difference calculated by the subtractor 1372c is greater than 32 in a positive direction ('01'), (c) whether the difference calculated by the subtractor 1372c is less than 32 in a negative direction ('10'), and (d) whether the difference calculated by the subtractor 1372c is greater than 32 in a negative direction ('11'). If these patterns are detected, the start pattern detector 1373c may recognize that the SOF marker SOF is received (for example, these patterns may be observed from the first to $16^{th}$ data symbols illustrated in FIG. 10).

That is, the start pattern detector 1373c may determine whether an increase and decrease in a phase of the reception data RX_DATA match the reference pattern, to detect the SOF marker SOF. To this end, the start pattern detector 1373c may determine whether a phase of the reception data RX_DATA increases as much as or more than the reference difference in a positive direction or decreases as much as or more than the reference difference in a negative direction, based on the difference between the first conversion value corresponding to the previous data symbol and the second conversion value corresponding to the current data symbol. When the reference pattern is observed, the start pattern detector 1373c may detect the SOF marker SOF being received.

In some cases, the detection reference information DR1 may include a value of a reference pattern mask. The reference pattern mask may indicate whether a corresponding reference pattern is referenced or not. For example, in the reference pattern mask, a value of '11' may mean that a corresponding reference pattern is referenced to detect the SOF marker SOF. On the other hand, a value of '00' may mean that a corresponding reference pattern is not referenced.

According to the example illustrated in FIG. 22, each of values of '00' and '10' of the reference pattern may correspond to a value of '00' of the reference pattern mask. In this example, the start pattern detector 1373c may ignore the values of '00' and '10' of the reference pattern. In this case, the start pattern detector 1373c may not detect whether the difference calculated by the subtractor 1372c is less than 32 in a positive direction ('00') and whether the difference calculated by the subtractor 1372c is less than 32 in a negative direction ('10').

Meanwhile, each of values of '01' and '11' of the reference pattern may correspond to a value of '11' of the reference pattern mask. In this example, the start pattern detector 1373c may refer to the values of '01' and '11' of the reference pattern to detect the SOF marker SOF. That is, the start pattern detector 1373c may detect whether the difference calculated by the subtractor 1372c is greater than 32 in a positive direction ('01') and whether the difference calculated by the subtractor 1372c is greater than 32 in a negative direction ('11').

For example, if the start pattern detector 1373c tightly operates to detect the SOF marker SOF, the reference pattern mask may include only values of '11'. However, if the start pattern detector 1373c roughly operates, the reference pattern mask may include values of '00' to ignore some reference patterns.

Values included in the detection reference information DR1 may be variously changed or modified such that the SOF marker SOF is properly detected. In some example embodiments, the detection reference information DR1 may include programmable values. For example, a designer, a manufacturer, and/or a user may flexibly change values included the detection reference information DR1.

Figure 23:
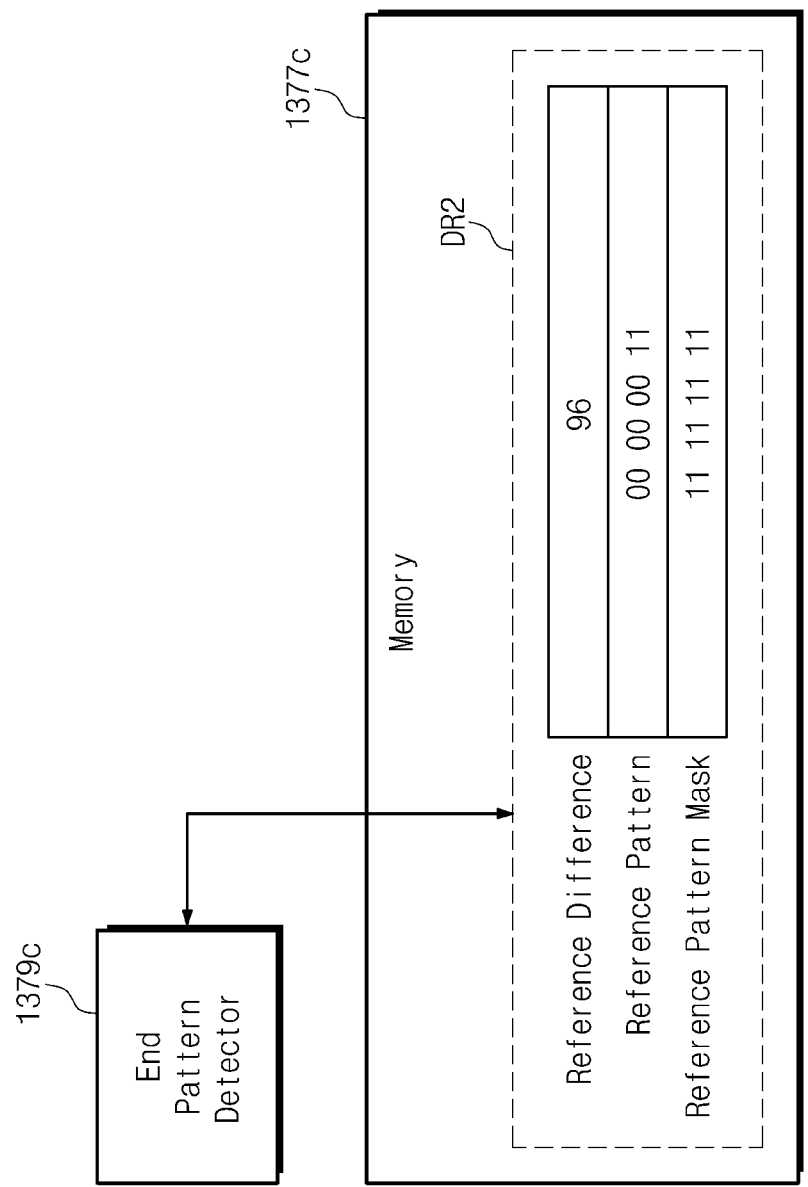

FIG. 23 is a conceptual diagram for describing an example operation of a decoder circuit of FIG. 20. FIG. 23 illustrates an example of detecting the EOF marker EOF in the decoder circuit 1370c.

The memory 1377c may store detection reference information DR2 that is referenced to detect the EOF marker EOF. The end pattern detector 1379c may detect the EOF marker EOF based on the detection reference information DR2.

For example, the detection reference information DR2 may include a value of a reference difference. The reference difference may be compared with a difference between a first conversion value corresponding to a previous data symbol and a second conversion value corresponding to a current data symbol. The end pattern detector 1379c may determine whether the difference between the first conversion value and the second conversion value is greater than the reference difference. The reference difference may be referenced substantially the same as or similar to the reference difference described with reference to FIG. 22.

For example, the detection reference information DR2 may include a value of a reference pattern. The reference pattern may be compared with a change pattern of the difference between the first conversion value and the second conversion value. The end pattern detector 1379c may detect whether the reference pattern is observed, to detect the EOF marker EOF. The reference pattern may be referenced substantially the same as or similar to the reference pattern described with reference to FIG. 22.

According to the example illustrated in FIG. 23, the end pattern detector 1379c may detect whether the difference calculated by the subtractor 1372c is less than 96 in a positive direction ('00') and whether the difference calculated by the subtractor 1372c is greater than 96 in a negative direction ('11'). If these patterns are detected, the end pattern detector 1379c may recognize that the EOF marker EOF is received.

In some cases, the detection reference information DR2 may include a value of a reference pattern mask. The reference pattern mask may indicate whether a corresponding reference pattern is referenced. The reference pattern mask may be referenced substantially the same as or similar to the reference pattern mask described with reference to FIG. 22.

Values included in the detection reference information DR2 may be variously changed or modified such that the EOF marker EOF is properly detected. In some example embodiments, the detection reference information DR2 may include programmable values. For example, a designer, a manufacturer, and/or a user may flexibly change values included in the detection reference information DR2.

Figure 24:
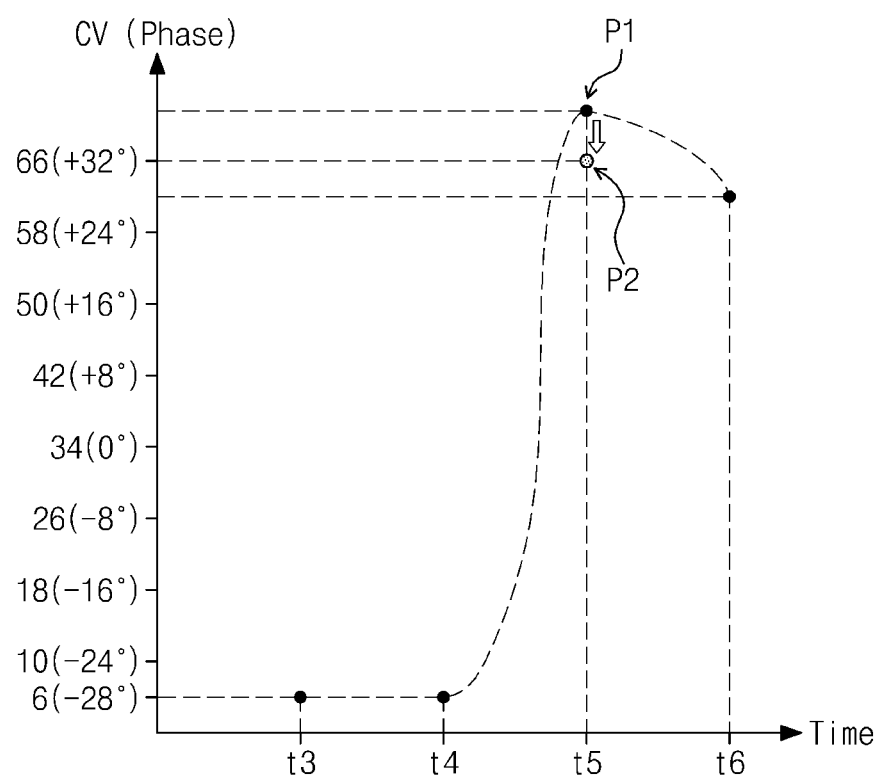
FIG. 24 is a graph for describing an example operation of a decoder circuit of FIG. 20.

FIG. 24 is a graph for describing an example operation of a decoder circuit of FIG. 20. To facilitate better understanding, FIG. 20 will be referenced together with FIG. 24.

The decoder circuit 1370c may receive a conversion value CV. As described above, when a reception characteristic of the antenna 1310 is changed, the decoder circuit 1370c may receive a conversion value CV different from an originally intended value. In some cases, the decoder circuit 1370c may receive an excessively biased conversion value CV.

For example, at a time 't5', the decoder circuit 1370c may receive a conversion value CV that exceeds 66 (refer to P1). For example, the decoder circuit 1370c may determine that the conversion value CV received at the time 't5' is excessively biased, according to a control of the start pattern detector 1373c and/or the characteristic analyzer 1374c. For example, when a communication error occurs or an error occurs in generating the conversion value CV, the excessively biased conversion value CV may be generated.

The excessively biased conversion value CV may cause an error in an operation of the decoder circuit 1370c. The decoder circuit 1370c may not properly process the excessively biased conversion value CV. Thus, in some example embodiments, the decoder circuit 1370c may correct/calibrate an absolute value of the excessively biased conversion value CV (refer to P2). The decoder circuit 1370c may operate based on the corrected conversion value CV.

As described above, the decoder circuit 1370c may prepare information of data symbols that will be received as the SOF marker SOF in advance. Thus, the decoder circuit 1370c may predict a conversion value CV to be received. When the actually received conversion value CV and the predicted value are different by (or more than) a reference amount or a reference rate, the decoder circuit 1370c may determine that the actually received conversion value CV is excessively biased. To this end, the decoder circuit 1370c may include a circuit configured to detect and correct the excessively biased conversion value CV.

In some cases, the decoder circuit 1370c may store information associated with the excessively biased conversion value CV in the memory 1377c. The stored information may be referenced by the decoder 1375c. A manufacturer and/or a designer may refer to the stored information to repair a device or to debug a circuit/program.

Figure 25:
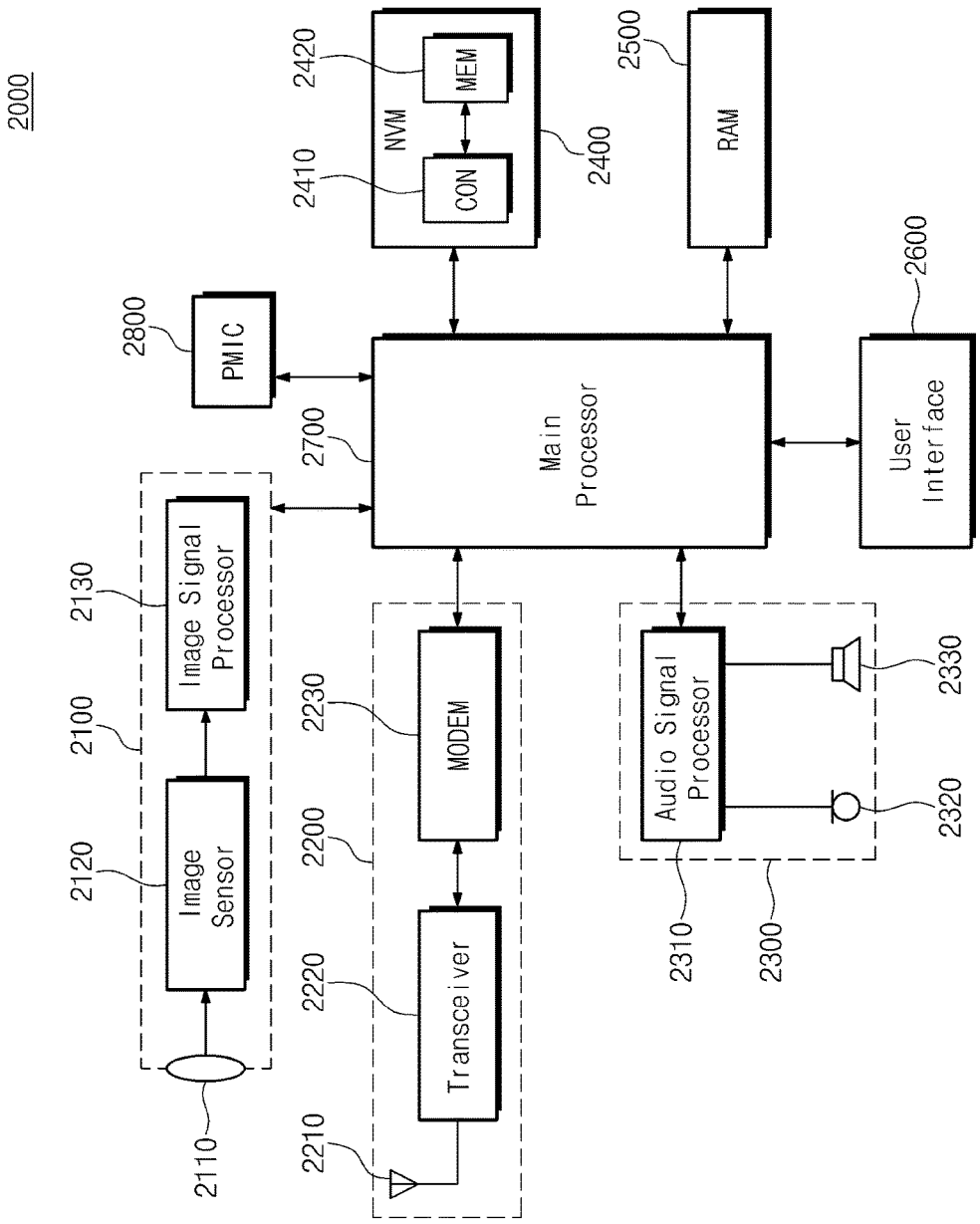
FIG. 25 is a block diagram of a mobile electronic device including a communication circuit chip in accordance with some example embodiments.

FIG. 25 is a block diagram of a mobile electronic device including a communication circuit chip in accordance with some example embodiments. The mobile electronic device 2000 may include an image processor 2100, a wireless communication block 2200, an audio processor 2300, a nonvolatile memory 2400, a RAM 2500, a user interface 2600, a main processor 2700, and a power management integrated circuit 2800. For example, the mobile electronic device 2000 may be one of a mobile communication terminal, a portable digital assistant (PDA), a personal media player (PMP), a digital camera, a smart phone, a tablet, a wearable device, and/or the like.

The image processor 2100 may receive light through a lens 2110. An image sensor 2120 and an image signal processor 2130 included in the image processor 2100 may generate an image based on the received light.

The wireless communication block 2200 may include an antenna 2210, a transceiver 2220, and a modulator/demodulator (MODEM) 2230. The wireless communication block 2200 may communicate with the outside of the mobile electronic device 2000 in compliance with at least one of various wireless communication protocols, such as GSM, CDMA, WCDMA, HSPA, EV-DO, LTE, WiMax, WiFi, WiFi direct, WiBro, RFID, Bluetooth, NFC, and/or the like.

The MODEM 2230 may include a communication circuit to process a wireless communication protocol. For example, the MODEM 2230 may be implemented in a communication circuit chip and may be equipped in the mobile electronic device 2000.

The MODEM 2230 may be configured according to, and may operate based on, the example embodiments of the present disclosure. For example, the MODEM 2230 may perform phase modulation/phase demodulation within a phase range PR narrower than 360°, to perform VHBR communication. The MODEM 2230 may detect a first data pattern of an SOF marker of reception data received through the antenna 2210. The MODEM 2230 may analyze a reception characteristic of the antenna 2210, based on a second data pattern following the first data pattern in the SOF marker. The MODEM 2230 may decode the reception data based on the analyzed reception characteristic.

According to the example embodiments, the MODEM 2230 may recognize the reception characteristic of the antenna 2210. Although an offset or distortion occurs in the reception characteristic of the antenna 2210, the MODEM 2230 may accurately decode the reception data with reference to the analyzed reception characteristic. Consequently, the MODEM 2230 may perform communication rapidly and stably.

The audio processor 2300 may process an audio signal by means of an audio signal processor 2310. The audio processor 2300 may receive an audio input through a microphone 2320, or may provide an audio output through a speaker 2330.

The nonvolatile memory 2400 may store data that needs to be preserved regardless of power supply. For example, the nonvolatile memory 2400 may include at least one of a flash memory, a PRAM, an MRAM, an ReRAM, an FRAM, and/or the like. A memory device 2420 may store data or may output the stored data under the control of a memory controller 2410.

The RAM 2500 may temporarily store data used in an operation of the mobile electronic device 2000. For example, the RAM 2500 may be used as a working memory, an operation memory, a buffer memory, and/or the like, of the mobile electronic device 2000. The RAM 2500 may temporarily store data processed or to be processed by the main processor 2700.

The user interface 2600 may process interfacing between a user and the mobile electronic device 2000 under the control of the main processor 2700. For example, the user interface 2600 may include an input interface, such as a keyboard, a keypad, a button, a touch panel, a touch screen, a touch pad, a touch ball, a camera, a microphone, a gyroscope sensor, a vibration sensor, and/or the like. For example, the user interface 2600 may include an output interface, such as a display device, a motor, and/or the like. For example, the display device may include at least one of a liquid crystal display (LCD), a light emitting diode (LED) display, an organic LED (OLED) display, an active matrix OLED (AMOLED) display, and/or the like.

The main processor 2700 may control an overall operation of the mobile electronic device 2000. The image processor 2100, the wireless communication block 2200, the audio processor 2300, the nonvolatile memory 2400, and the RAM 2500 may perform a user command provided through the user interface 2600 under the control of the main processor 2700. The image processor 2100, the wireless communication block 2200, the audio processor 2300, the nonvolatile memory 2400, and the RAM 2500 may provide a service to a user through the user interface 2600 under the control of the main processor 2700.

The main processor 2700 may be implemented in a system-on-chip (SoC). For example, the main processor 2700 may include an application processor.

The power management integrated circuit 2800 may manage power used in an operation of the mobile electronic device 2000. For example, the power management integrated circuit 2800 may suitably convert power provided from a battery (not illustrated) or an external power supply (not illustrated). Further, the power management integrated circuit 2800 may provide the converted power to components of the mobile electronic device 2000.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Although detailed embodiments have been described, it should be understood that numerous other modifications, changes, variations, and substitutions can be devised by those skilled in the art. Moreover, it should be understood that the present disclosure covers various techniques which can be readily modified and embodied based on the above-described example embodiments.

What is claimed is:

1. An electronic device comprising:
   a clock recovery circuit configured to generate a reference clock based on reception data, the reception data being received through an antenna;
   a converter circuit configured to generate a first conversion value that corresponds to a difference between a phase of the reception data and a phase of the reference clock; and
   a decoder circuit configured to decode the first conversion value into a digital value, wherein the decoder circuit comprises:
   a start pattern detector configured to detect a start-of-frame (SOF) marker, which indicates a start of the reception data, by recognizing a data pattern comprising a plurality of reference symbols within the reception data;
   a characteristic analyzer configured to generate a representation of a reception characteristic of the antenna based on second conversion values that correspond to the data pattern; and
   a decoder configured to decode, with reference to the representation of the reception characteristic, the first conversion value, which corresponds to encoded data following the SOF marker in the reception data, such that the digital value is generated.

2. The electronic device of claim 1, wherein the reception characteristic is associated with at least one of:
   whether the phase of the reception data decreases below a first target value during a time interval where the phase of the reception data is decreasing,
   whether the phase of the reception data increases over a second target value during a time interval where the phase of the reception data is increasing, or
   whether a difference between third conversion values that correspond to adjacent data symbols in the reception data is changed.

3. The electronic device of claim 1, wherein the decoder is further configured to:

compensate a third conversion value that corresponds to a data symbol of the encoded data, based on the representation of the reception characteristic, and decode the compensated third conversion value into the digital value.

4. The electronic device of claim 1, wherein the characteristic analyzer is configured to separately generate a first representation of a first reception characteristic associated with a time interval where the phase of the reception data is decreasing and generate a second representation of a second reception characteristic associated with a time interval where the phase of the reception data is increasing.

5. The electronic device of claim 1, wherein the characteristic analyzer is configured to generate the representation of the reception characteristic whenever the start pattern detector detects the data pattern.

6. The electronic device of claim 1, wherein:

the start pattern detector is configured to detect a first data pattern corresponding to the SOF marker, the characteristic analyzer is configured to generate the representation of the reception characteristic based on third conversion values that correspond to a second data pattern corresponding to the SOF marker, and the second data pattern follows the first data pattern in the reception data, and does not overlap the first data pattern.

7. The electronic device of claim 6, wherein:

the SOF marker further corresponds to a third data pattern that follows the second data pattern within the reception data and does not overlap the first and second data patterns, and the characteristic analyzer is configured to verify the representation of the reception characteristic based on fourth conversion values that correspond to the third data pattern.

8. The electronic device of claim 7, wherein:

the encoded data follows the third data pattern in the reception data, and does not overlap the first, second, and third data patterns, and the decoder is configured to decode the first conversion value that corresponds to the encoded data in response to completion of the third data pattern.

9. The electronic device of claim 1, wherein:

the decoder circuit is configured to decode a difference between the first conversion value and a third conversion value into the digital value, and the first conversion value corresponds to a first data symbol included in the reception data, and the third conversion value corresponds to a second data symbol following the first data symbol in the reception data.

10. The electronic device of claim 1, wherein:

the decoder circuit further comprises an end pattern detector configured to detect a data pattern of an end-of-frame (EOF) marker that indicates the end of the reception data, and the decoder is further configured to finish decoding in response to the data pattern of the EOF marker being detected by the end pattern detector.

11. A communication circuit chip comprising:

a start pattern detector configured to detect a start-of-frame (SOF) marker, which indicates a start of reception data, by recognizing a first data pattern comprising a plurality of reference symbols within the reception data, the reception data being received through an antenna;

a characteristic analyzer configured to generate a representation of a reception characteristic of the antenna based on phase differences between a phase of a reference clock and phases of a second data pattern following the first data pattern in the reception data; and a decoder configured to generate, with reference to the representation of the reception characteristic, a digital value that corresponds to a phase difference between the phase of the reference clock and a phase of encoded data following the SOF marker in the reception data.

12. The communication circuit chip of claim 11, further comprising:

a latch configured to store a first value that corresponds to a phase difference associated with a first data symbol included in the reception data; and a subtractor configured to calculate a difference between the first value stored in the latch and a second value, the second value corresponding to a phase difference associated with a second data symbol following the first data symbol in the reception data.

13. The communication circuit chip of claim 12, wherein:

the start pattern detector is configured to detect the first data pattern based on the difference between the first value and the second value, the characteristic analyzer is configured to generate the representation of the reception characteristic based on the difference between the first value and the second value, and the decoder is configured to generate the digital value based on the difference between the first value and the second value.

14. The communication circuit chip of claim 12, wherein the start pattern detector is configured to detect the first data pattern in response to determining, based on the difference between the first value and the second value, whether a phase of the reception data increases as much as or more than a reference increment in a positive direction and whether the phase of the reception data decreases as much as or more than the reference increment in a negative direction.

15. The communication circuit chip of claim 14, further comprising:

a memory configured to store information associated with the reference increment and a reference pattern, wherein the start pattern detector is configured to detect reception of the first data pattern in response to determining that the increase and decrease of the phase of the reception data match the reference pattern.

\* \* \* \* \*